(12) United States Patent
Anand

(10) Patent No.: US 11,900,704 B2
(45) Date of Patent: Feb. 13, 2024

(54) AUTOMATED DETECTION OF TAMPERING

(71) Applicant: Ashish Anand, Bangalore (IN)

(72) Inventor: Ashish Anand, Bangalore (IN)

( * ) Notice: Subject to any disclaimer, the term of this patent is extended or adjusted under 35 U.S.C. 154(b) by 96 days.

(21) Appl. No.: 17/044,337

(22) PCT Filed: Mar. 14, 2019

(86) PCT No.: PCT/IB2019/052073
§ 371 (c)(1),
(2) Date: Oct. 1, 2020

(87) PCT Pub. No.: WO2019/193438
PCT Pub. Date: Oct. 10, 2019

(65) Prior Publication Data
US 2021/0082321 A1 Mar. 18, 2021

(30) Foreign Application Priority Data

Apr. 3, 2018 (IN) .............................. 201841012699
Aug. 10, 2018 (IN) .............................. 201841030160
(Continued)

(51) Int. Cl.
*G06V 20/80* (2022.01)
*G09F 3/00* (2006.01)
(Continued)

(52) U.S. Cl.
CPC ................ *G06V 20/80* (2022.01); *G06T 7/70* (2017.01); *G06V 10/17* (2022.01); *G06V 10/95* (2022.01);
(Continued)

(58) Field of Classification Search
CPC ..... G09F 3/0376; G09F 3/0292; B65D 27/30; B65D 55/02
See application file for complete search history.

(56) References Cited

U.S. PATENT DOCUMENTS

2007/0048875 A1* 3/2007 Lappe .............. G01N 35/00871
436/164
2009/0091457 A1* 4/2009 Kresse .................. G09F 3/0292
340/572.8
(Continued)

OTHER PUBLICATIONS

Encyclopedia.com, Hard Disk, May 2018, https://www.encyclopedia.com/science-and-technology/computers-and-electrical-engineering/computers-and-computing/hard-disk (Year: 2018).*

*Primary Examiner* — Vincent Rudolph
*Assistant Examiner* — Raphael Schwartz

(57) ABSTRACT

The method to determine tampering of a security label (102) comprises, associating at least a portion of a first pattern to an external reference (110), wherein a first layer (202) of the security label (102) comprises the first pattern. Further, a second pattern (206) defined in a second layer (204) is used to change the contour of the portion of the first pattern, when the security label (102) is at least partially disengaged from a surface. Subsequently, when there is change in contour of the portion of the first pattern, the portion of the first pattern is disassociated from an external reference (110). Further, the portion of the first pattern and the external reference (110) are scanned and finally tampering of the security label (102) is determined based on the association between the portion of the first pattern and the external reference (110).

1 Claim, 25 Drawing Sheets

(30) Foreign Application Priority Data

| Aug. 14, 2018 | (IN) | ............................. 201841030556 |
| Aug. 20, 2018 | (IN) | ............................. 201841031024 |
| Sep. 25, 2018 | (IN) | ............................. 201841035949 |
| Oct. 3, 2018 | (IN) | ............................. 201841037235 |
| Nov. 12, 2018 | (IN) | ............................. 201841042402 |

(51) Int. Cl.
    *G06V 10/94*     (2022.01)
    *G06T 7/70*     (2017.01)
    *G06V 10/10*     (2022.01)

(52) U.S. Cl.
    CPC .......... *G09F 3/0292* (2013.01); *G09F 3/0297* (2013.01); *G06T 2207/10008* (2013.01)

(56) References Cited

U.S. PATENT DOCUMENTS

| 2013/0008962 | A1* | 1/2013 | Anand | G06V 10/225 |
| | | | | 235/487 |
| 2018/0033341 | A1* | 2/2018 | Weeks | G09F 3/0317 |
| 2020/0394372 | A1* | 12/2020 | Fontaine | B41M 3/14 |

* cited by examiner

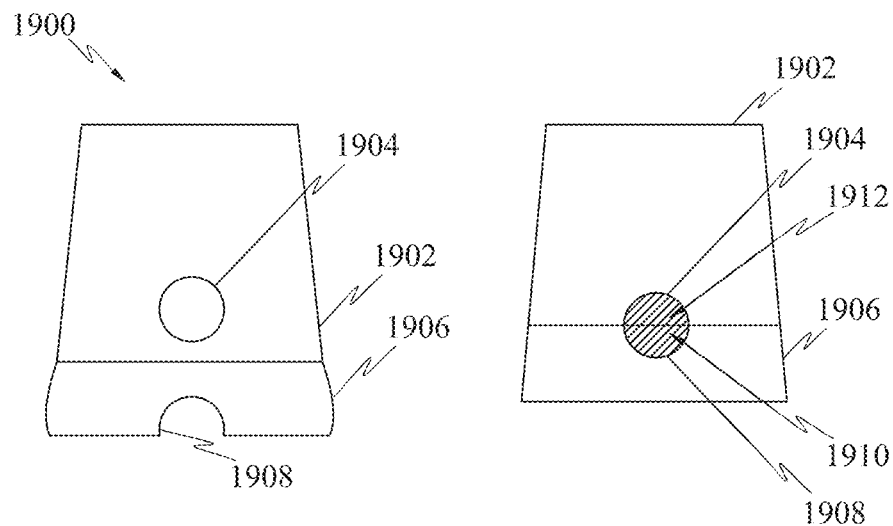
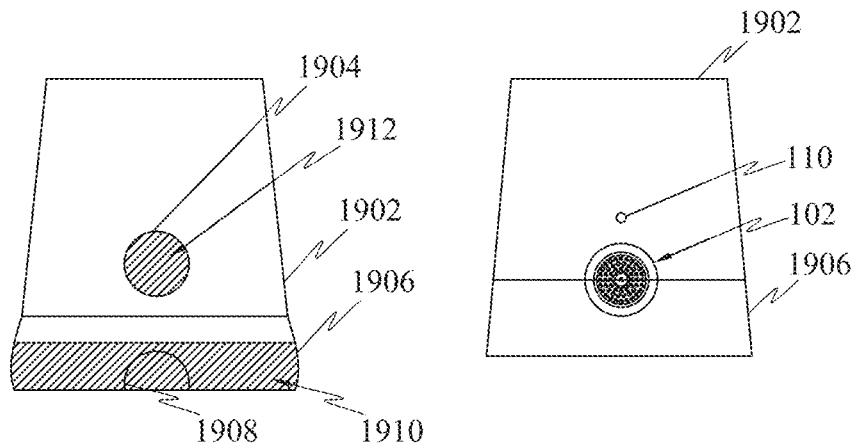
FIG. 19A  FIG. 19C
FIG. 19B  FIG. 19D

AUTOMATED DETECTION OF TAMPERING

CROSS-REFERENCE TO RELATED APPLICATIONS

This patent application claims priority benefit from the following Indian provisional applications: 201841012699 filed on Apr. 3, 2018; 201841030160 filed on Aug. 10, 2018; 201841030556 filed on Aug. 14, 2018; 201841031024 filed on Aug. 20, 2018; 201841035949 filed on Sep. 25, 2018; 201841037235 filed on Oct. 3, 2018; and 201841042402 filed on Nov. 12, 2018.

BACKGROUND

Unless otherwise indicated herein, the materials described in this section are not prior art to the claims in this application and are not admitted to being prior art by inclusion in this section.

FIELD OF INVENTION

The disclosed subject matter generally relates to the field of security labels, and more particularly but not exclusively, to the field of detecting tampering of the security labels.

DISCUSSION OF PRIOR ART

Generally, in logistics, the object to be transported is packed using a protective package before being shipped. However, there are chances that a person with malicious intent may tamper the package and cause damage to the object within the package. This unauthorised access to the package or the object can be detected by tamper-evident technology. One of the widely known and well established passive tamper-evident technology is tamper-evident label/security label. These labels, after application over a surface of the package, when removed, leave a visible mark on the surface of the package, thereby indicating tampering of the package. However, the conventional tamper-evident labels have certain associated disadvantages.

Conventionally, security labels are applied over a surface of the outer package. In such case, it is possible for a person to access the object inside the package without tampering the security label applied over the surface of the outer package.

Further, existing security label technologies require registration of the security label after applying it to the surface of the package. However, registering the security label in the packaging line is highly difficult and will severely impact the operational efficiency of the packaging process.

In shipping industry, packages generally have multiple credentials, in the form of labels/tags, each carrying a unique information. Conventionally, the credentials are scanned individually and further linked with each other, which is time consuming.

In general, a package includes a security label to detect tampering of the package and a tracking code such as barcode, QR code, and the like to identify the package.

U.S. Pat. No. 9,361,532B2 discloses label associated with an external reference, wherein external means reference is not the inherent part of label, it can be outside the label, below a transparent portion of label or on transparent surface over the label such that label and reference both can be scanned by vision based technologies.

In light of the foregoing discussion, there is a need for an improved security label, method of packaging, method and system for registering the security label, and method and system for detecting tampering of security labels.

SUMMARY

In an embodiment, a security label is provided to be engaged to a surface. The security label comprises a first layer and a second layer. The first layer comprises a first pattern. The first pattern comprises at least a portion of the first pattern capable of being associated with an external reference and the portion of the first pattern is scannable to determine tampering of the security label. The second layer comprises a second pattern, wherein the second pattern is invisible until the security label is at least partially disengaged from the surface.

In another embodiment, a method is provided to determine tampering of a security label. The method comprises associating at least a portion of a first pattern to an external reference, wherein a first layer of the security label comprises the first pattern. A second pattern is used to change contour of the portion of the first pattern, when the security label is at least partially disengaged from a surface, wherein a second layer of the security label comprises the second pattern. The portion of the first pattern is dissociated from an external reference when there is change in contour of the portion of the first pattern. The portion of the first pattern and the external reference is scanned to determine tampering of the security label based on the association between the portion of the first pattern and the external reference.

In another embodiment, a system is provided for detecting tampering of a security label. The system comprises security label configured to be engaged to a surface, a security label detecting module and a tamper detecting module. The security label comprises a first layer comprising a first pattern and a second layer comprising a second pattern. At least a portion of the first pattern is capable of being associated with an external reference. The portion of the first pattern is scannable to determine tampering of the security label. The second pattern is invisible until the security label is at least partially disengaged from the surface. The security label detecting module is configured to detect the portion of the first pattern and the external reference. The tamper detecting module is configured to determine the association between the detected portion of the first pattern and the external reference and detect tampering based on the association between the detected portion of the first pattern and the external reference.

In another embodiment, a method of packaging is provided. The method comprises placing an article inside a package, wherein at least a surface of the package defines an aperture. At least a portion of the article is exposed by the aperture. Engaging a security label such that the security label covers at least a portion of the aperture. The security label is affixed to the portion of the article exposed by the aperture. The security label is affixed to the package.

In another embodiment, a system comprises a package, wherein at least a surface of the package defines an aperture, an article and a security label. The article is configured to be placed inside the package, wherein at least a portion of the article is exposed by the aperture. The security label is configured to be engaged such that the security label covers at least a portion of the aperture. The security label is affixed to the portion of the article exposed by the aperture and the security label is affixed to the package.

BRIEF DESCRIPTION OF DRAWINGS

Embodiments are illustrated by way of example and not limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. However, it may be apparent to one with ordinary skill in the art, that the present invention may be practised without these specific details. In other instances, well-known methods, procedures and components have not been described in detail so as not to unnecessarily obscure aspects of the embodiments. The embodiments can be combined, other embodiments can be utilized, or structural, logical, and design changes can be made without departing from the scope of the claims. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Overview

In one embodiment, a security label is provided, which can be engaged to a package. The security label comprises a first layer comprising a first pattern and a second layer comprising a second pattern. A portion of the first pattern is associated to an external reference, wherein the external reference is external to the security label. The external reference is engaged either to the package or to an article placed within the package. When the security label is peeled off the package with the intention of tampering and reapplied, there is a change in contour in the first pattern. The second pattern contributes to the change in contour of the first pattern. This change in contour, disassociates the first pattern from the external reference. A scanner is used to detect the first pattern and the external reference. The scanner detects the tampering, if the security label has been tampered with, as a result of disassociation of the first pattern and the external reference.

In another embodiment, a tamper proof packaging is provided. The packaging comprises a package, an article to be placed inside the package and a security label. The package defines an aperture such that when an article is placed inside the package, the article is exposed by the aperture. A security label is engaged to the package such that the security label is also engaged to the article.

System for Detecting Tampering of a Security Label

Figure 1:
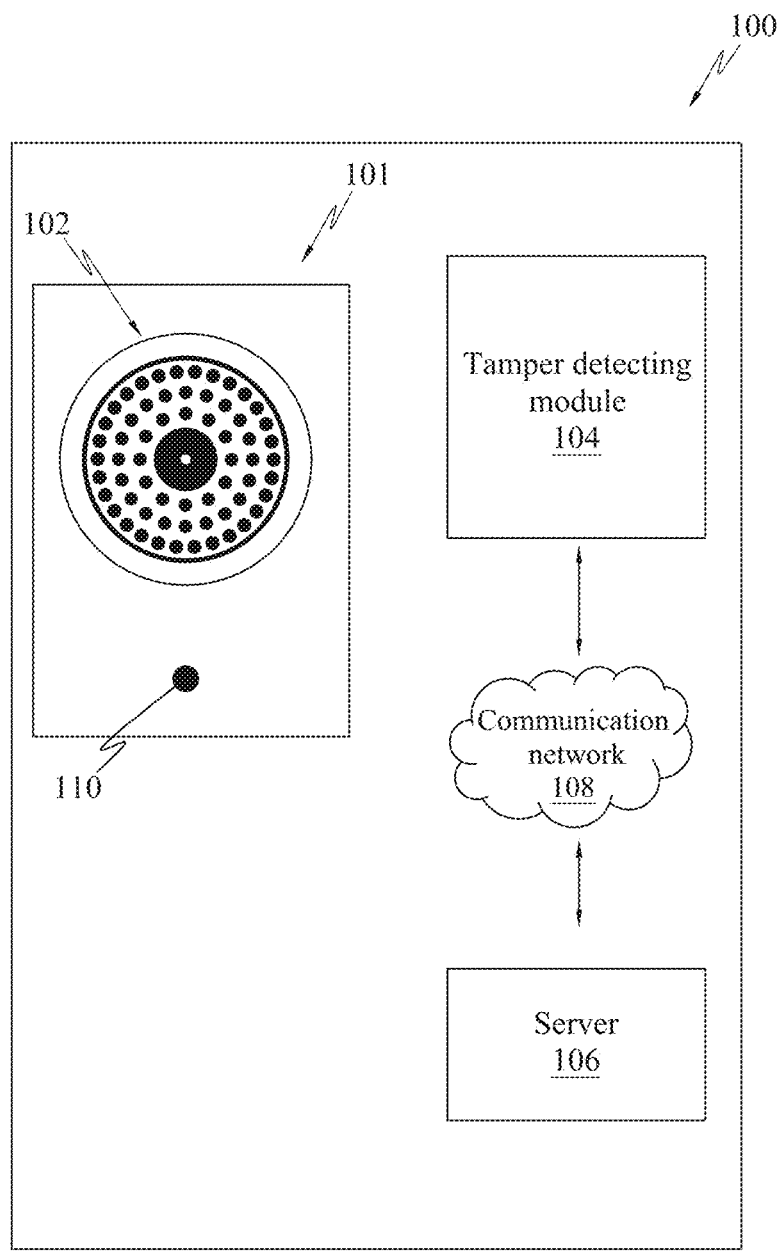
FIG. 1 illustrates a system 100 for detecting tampering of security label 102.

Referring to FIG. 1, a system 100 is provided for detecting tampering of security label. The system 100 comprises a security label 102, a reference 110 (external reference) external to the security label 102, a tamper detection module 104 and a server 106. The security label 102 and the external reference 110 is disposed on an article 101. The tamper detection module 104 is configured to determine the spatial orientation of the security label 102 with respect to the external reference 110. The tamper detection module 104 communicates with the server 106 using a communication module 108 to determine whether the spatial orientation so determined during verification is same as the orientation so determined during registration.

Figure 2A:
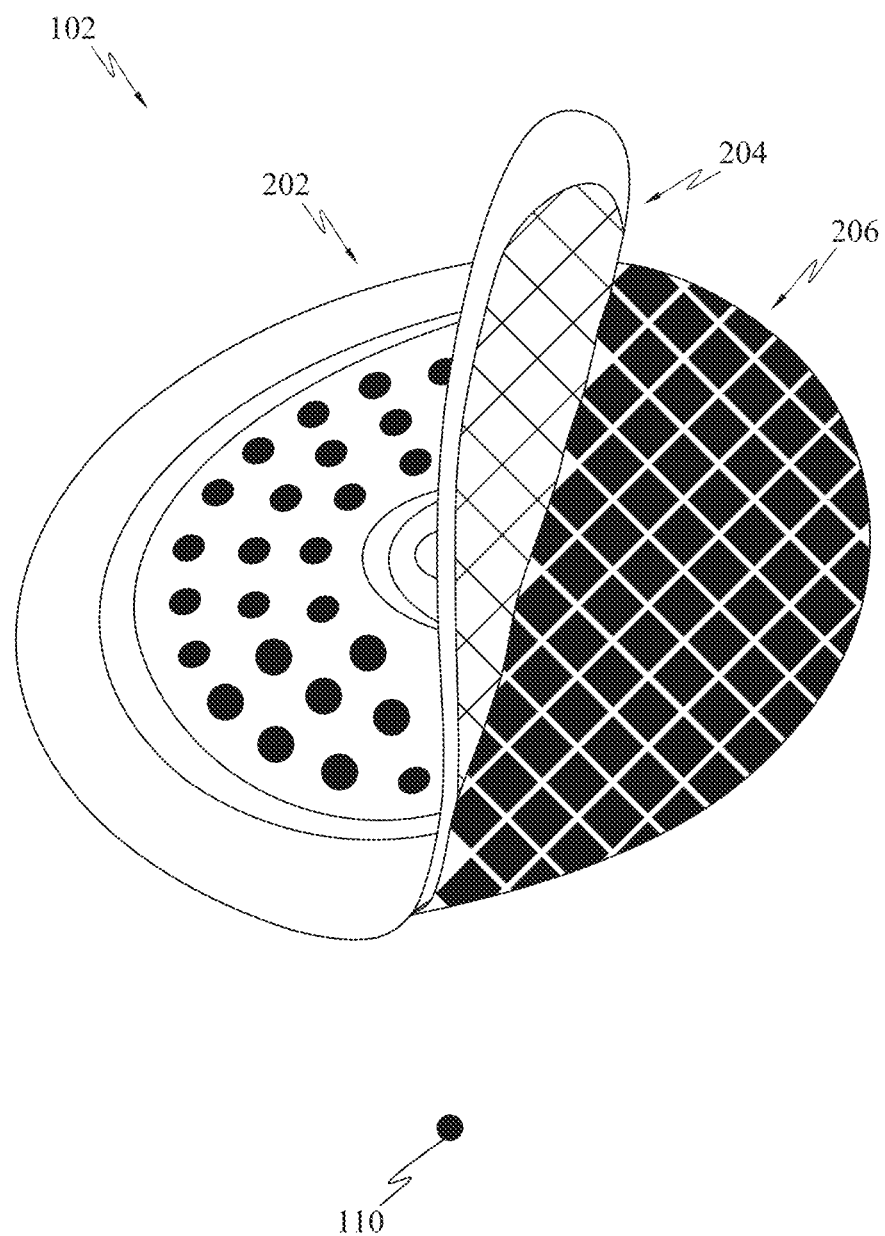
FIG. 2A depicts a partially peeled security label 102.
Figure 2B:
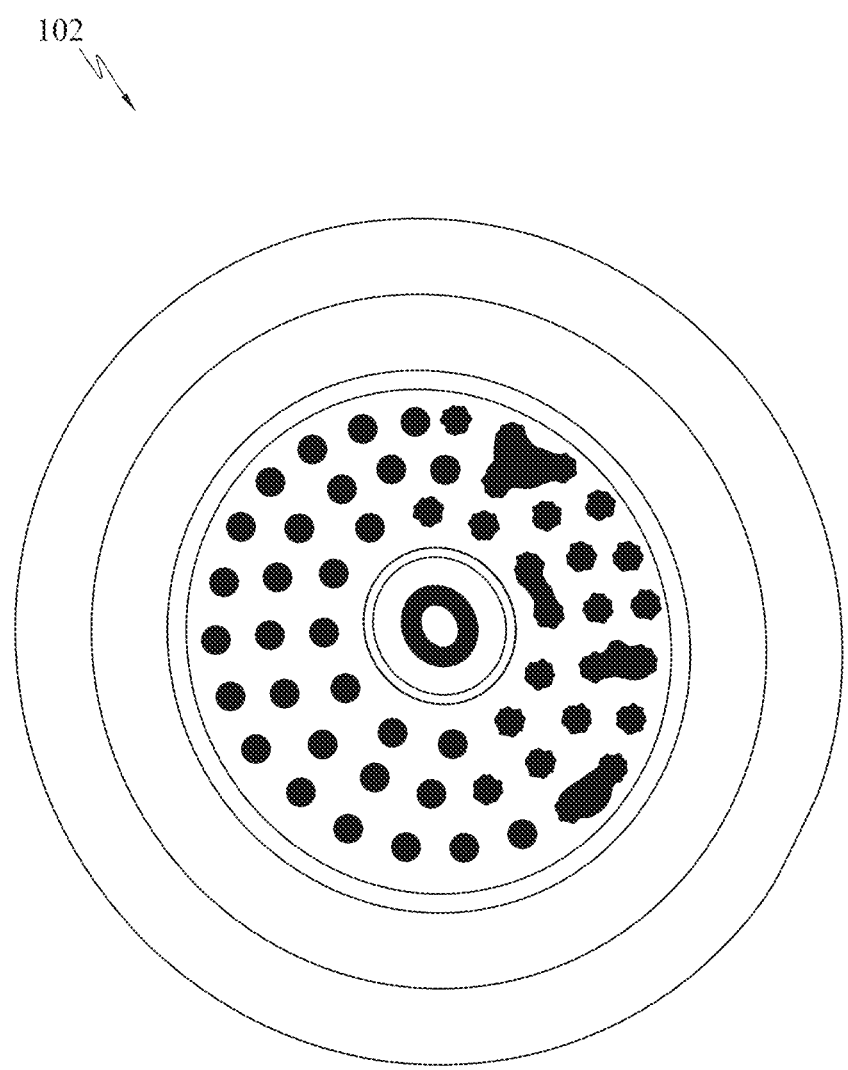
FIG. 2B depicts a re-applied partially peeled security label 102.

An embodiment of the security label 102 is discussed in greater detail in reference to FIGS. 2A and 2B. The security label 102 may be configured to be engaged to a surface. Referring to FIG. 2A, the security label 102 may comprise two layers, a first layer 202 and a second layer 204. The first layer 202 defines a first pattern and the second layer 204 defines a second pattern. It shall be noted that the expressions "first" and "second" doesn't necessarily indicate the sequence of the layers.

In an embodiment, a portion of the first pattern may be associated to an external reference 110. The portion, as an example, may be two dots among the several dots visible in the illustration.

The external reference 110 is external to the security label and may be located outside the security label 102. Further, the portion of first pattern and the external reference 110 may be associated with each other, wherein the association may be spatial or geometric orientation, among others.

In an embodiment, the external reference 110 may be a barcode, QR code or the like. In other words, external reference 110 may be a machine identifiable entity that is outside the security label 102, which means that the security label 102 (in view of the scannable portion of the first pattern) can have a random spatial orientation with respect to the external reference 110.

In an embodiment, the security label 102 and the external reference 110 may be applied/present to the same surface or two different surfaces. The surface may be that of an article or a package.

In an embodiment, the second layer 204 of the security label 102 may be configured to reveal a second pattern 206 on the surface, to which the security label 102 is engaged, when the security label 102 is disengaged at least partially from the surface. Therefore, when the security label 102 is reapplied, the second pattern (portion that has been revealed) merges with the first pattern, thereby changing dimension of some of the portions (e.g., some dots that coincide with the revealed second pattern) the first pattern (Refer FIG. 2B), as visible to a machine that tries to determine the orientation of the security label 102 with reference to the external reference 110, by considering some of the dots (whose dimension may have changed as explained) as internal reference of the label 102. Such a change in profile or dimension of the dots enables determination of tampering with the label 102.

In an embodiment, the security label 102 may comprise a third layer, typically a heat shrink lamination, that may be configured to shrink upon heating. The shrinking of the third layer causes a change in contour of at least a portion of the first pattern thereby detecting tampering of the package. In the absence of the third layer, the heating of the security label 102 causes the adhesive in the second layer to lose its adhesiveness thereby resulting in the second pattern 206 not getting exposed after disengaging the security label 102.

Figure 3:
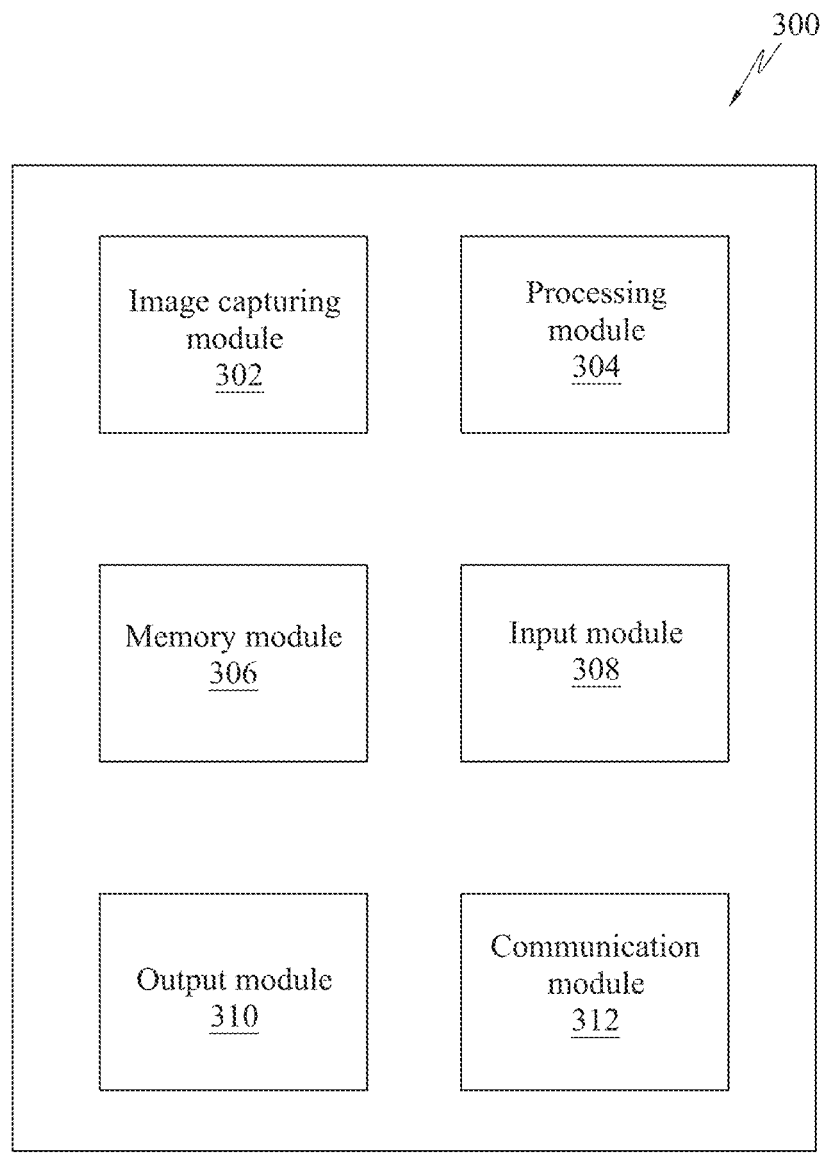
FIG. 3 illustrates modules of a device 300 that includes the tamper detecting module.

FIG. 3 illustrates a device 300 that includes the tamper detecting module 104. The device 300 comprise an image capturing module 302, a processing module 304, a memory module 306, input modules 308, output modules 310 and a communication module 312. The tamper detecting module 104 may be executed by the processing module 304.

The image capturing module 302 may be a camera that captures one or more images of the label 102 along with the external reference 110. The type of camera used may depend based on the pattern within the label 102 that is used for determining the orientation of the label 102 with respect to the external reference 110.

The processing module 304 may be implemented in the form of one or more processors and may be implemented as appropriate in hardware, computer-executable instructions, firmware, or combinations thereof. Computer-executable instruction or firmware implementations of the processing module 304 may include computer-executable or machine-executable instructions written in any suitable programming language to perform the various functions described.

The memory module 306 may include a permanent memory such as hard disk drive, may be configured to store data, and executable program instructions that are implemented by the processing module 304. The memory module 306 may be implemented in the form of a primary and a secondary memory. The memory module 306 may store additional data and program instructions that are loadable and executable on the processing module 304, as well as data generated during the execution of these programs. Further, the memory module 306 may be volatile memory, such as random-access memory and/or a disk drive, or non-volatile memory. The memory module 306 may comprise of removable memory such as a Compact Flash card, Memory Stick, Smart Media, Multimedia Card, Secure Digital memory, or any other memory storage that exists currently or may exist in the future.

The input modules 308 may provide an interface for input devices such as keypad, touch screen, mouse, microphone and stylus among other input devices.

The output modules 310 may provide an interface for output devices such as display screen, speakers, printer and haptic feedback devices, among other output devices.

The communication module 312 may be used by the device 300 to communicate with the server 106. The communication module 312, as an example, may be a GPRS module, or other modules that enable communication. The communication module 312 may include a modem, a network interface card (such as Ethernet card), a communication port, or a Personal Computer Memory Card International Association (PCMCIA) slot, among others. The communication module 312 may include devices supporting both wired and wireless protocols. Data in the form of electronic, electromagnetic, optical, among other signals may be transferred via the communication module 312.

The device 300 may include a scanning module that may scan an identification code associated with an item or package and communicate the same to the server 106. The server 106 may use the code to compare the orientation of the security label 102 with respect to the reference at the time of registration and verification.

Figure 4:
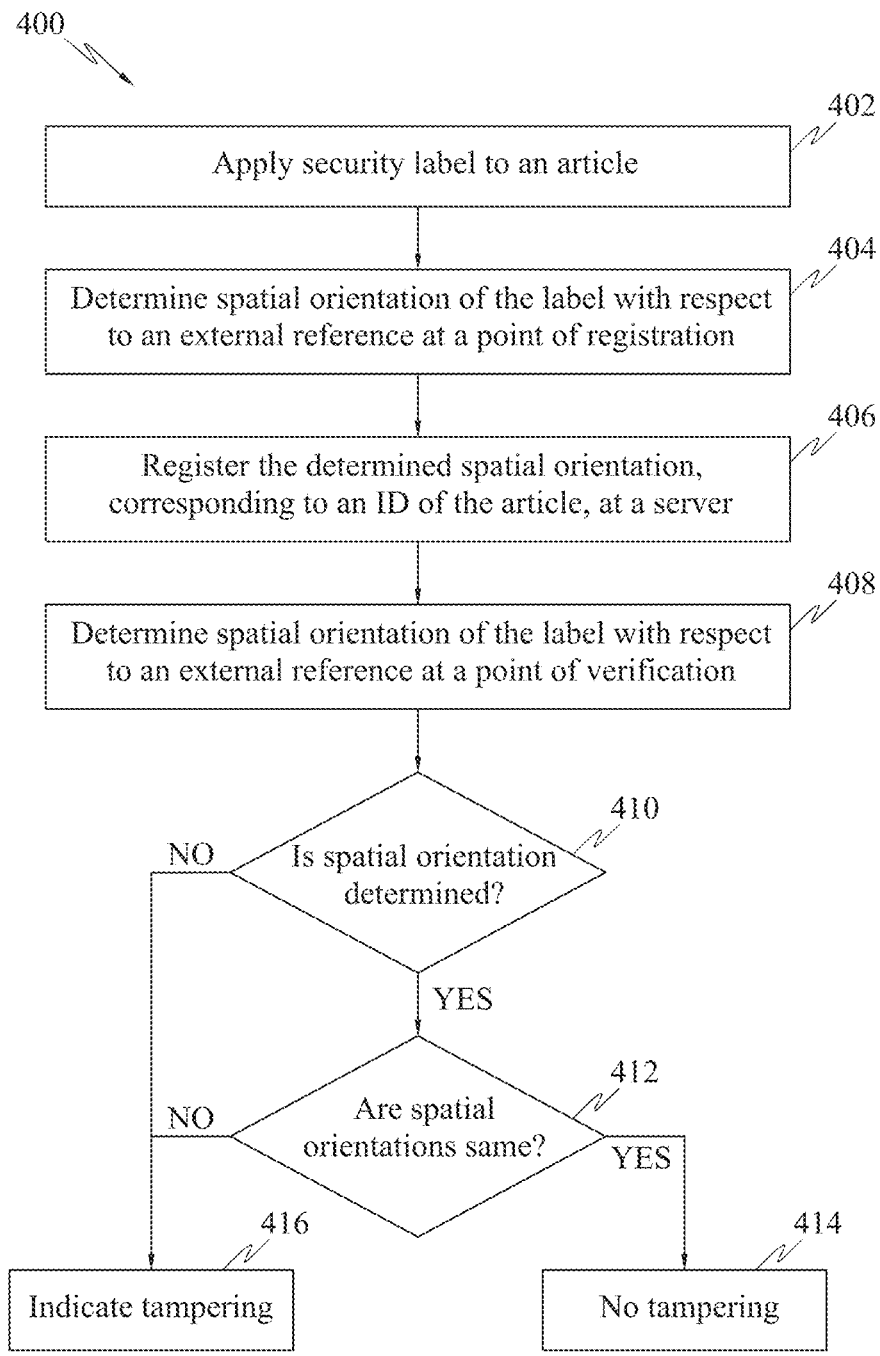
FIG. 4 is a flowchart of a method of detecting tampering of security labels.

FIG. 4 is a flowchart of a method of detecting tampering of security labels 102. Referring to step 402, the security label 102 is applied to an article or a package. The security label 102 may be applied automatically on the article or the package by a machine that is configured to apply security labels 102 on the packages conveyed in a packaging line.

At step 404, the spatial orientation (in view of the scannable portion of the first pattern) of the security label 102 with respect to the external reference 110 is determined at a point of registration. As an example, the two largest circles among plurality of circles in the first pattern is associated with the external reference 110. The geometric parameters such as distance between the external reference 110 and each of the two largest dots, angle between the lines joining the external reference 110 and each of the two dots and so on can be used as the spatial orientation.

At step 406, the determined spatial orientation of the security label 102 with respect to the external reference 110 is associated to an ID of the article and registered at the server 106. The ID of the article may be a unique identifier such as barcode, QR code or the like, that uniquely identifies the article. The ID of the article may be scanned by a scanning device that may be configured to associate the spatial orientation of the security label 102 with the ID of the article.

At step 408, the article is verified for tampering at a point of verification. The spatial orientation of the security label 102 with respect to the external reference 110 is determined. A scanning device similar to the device 300 may be configured to scan the security label 102 and the external reference 110. The scanning device may be configured to communicate with the server 106 to obtain the information pertaining to spatial orientation of the security label 102 to the corresponding ID of the article.

At step 410, the spatial orientation of the security label 102 pertaining to ID of the article is verified. In a scenario, wherein the security label 102 is tampered (Referring to FIG. 2B), the second pattern of the security label 102 merges with the first pattern of the security label 102 causing a change in dimension of the first pattern (or a portion thereof). In such case, the scanning device fails to detect the spatial orientation of the security label 102 with respect to the external reference 100 due to the distortion of the first pattern, further the scanning device may indicate the tampering of the article (step 416). In another scenario, the scanning device may recognize a portion of the first pattern that is not registered at the server 106. As an example, the scanning device may recognize circles other than two largest circles as a pattern registered at the server 106 because of the change in dimension of the first pattern caused by the tampering of the security label (Referring to FIG. 2B). In such case, the spatial orientation of the security label 102 recognized by the scanning device is further scrutinized.

At step 412, the spatial orientation of the security label 102 that is recognized by the scanning device is compared with the spatial orientation information available in the server 106. If the spatial orientation of the security label 102 matches with the spatial orientation associated to the ID of the article the scanning device indicates no tampering (step 414). If the spatial orientation of the security label 102 does not match with the spatial orientation associated to the ID of the article the scanning device indicates tampering of the article (step 416).

Figure 20A:
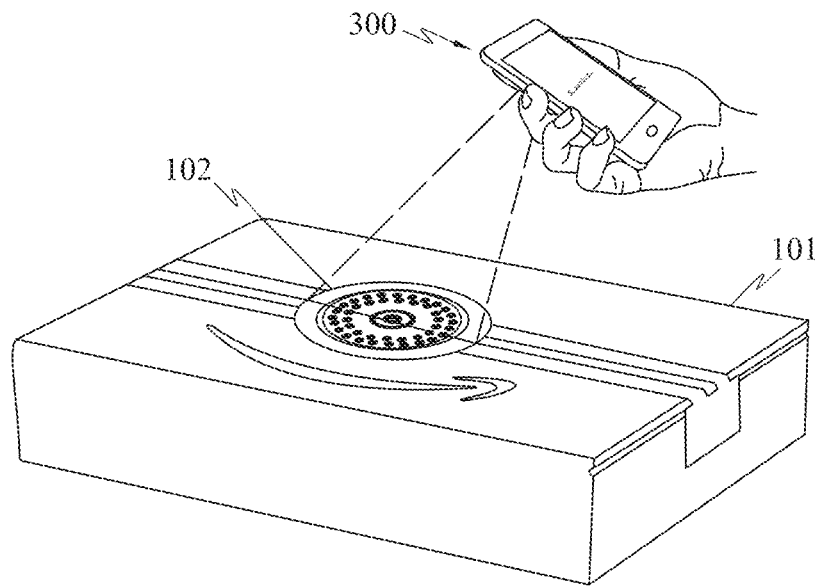
FIGS. 20A-20B illustrates post-mortem analysis of a scanned instant image.
Figure 20B:
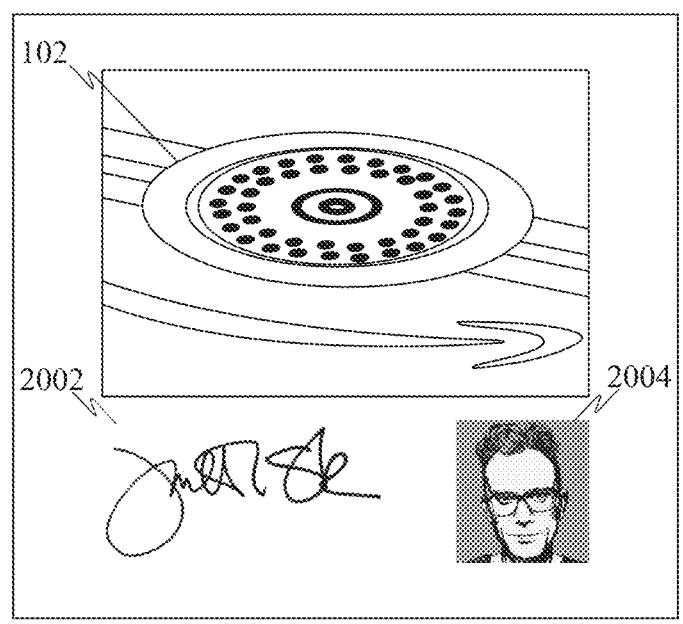

FIGS. 20A-20B illustrates a post-mortem analysis of a scanned instant image. Referring to FIG. 20A, the device 300 may scan the package 101 to capture an image of the security label 102. Referring specifically to FIG. 20B, the device 300 may be configured to receive a signature 2002 and a picture 2004 of a delivery personnel. It shall be noted that the post-mortem analysis of the instant image on which scanning is reported becomes very handy to determine actual state of label and scan condition. For example, height of scan, orientation of scan, intentional or unintentional defacing of label or label kept out of scan-preview. Post-mortem analysis can be done manually or automated. It also prevents intentional mis-reporting. For example, someone may keep label out-of-preview and then complaint about not being able to scan or somebody may hide the reference point or create another reference-point just to cause tampering and nuisance. The device 300 may communicate the scanned image with the server 106 to perform a post-mortem analysis.

Figure 5:
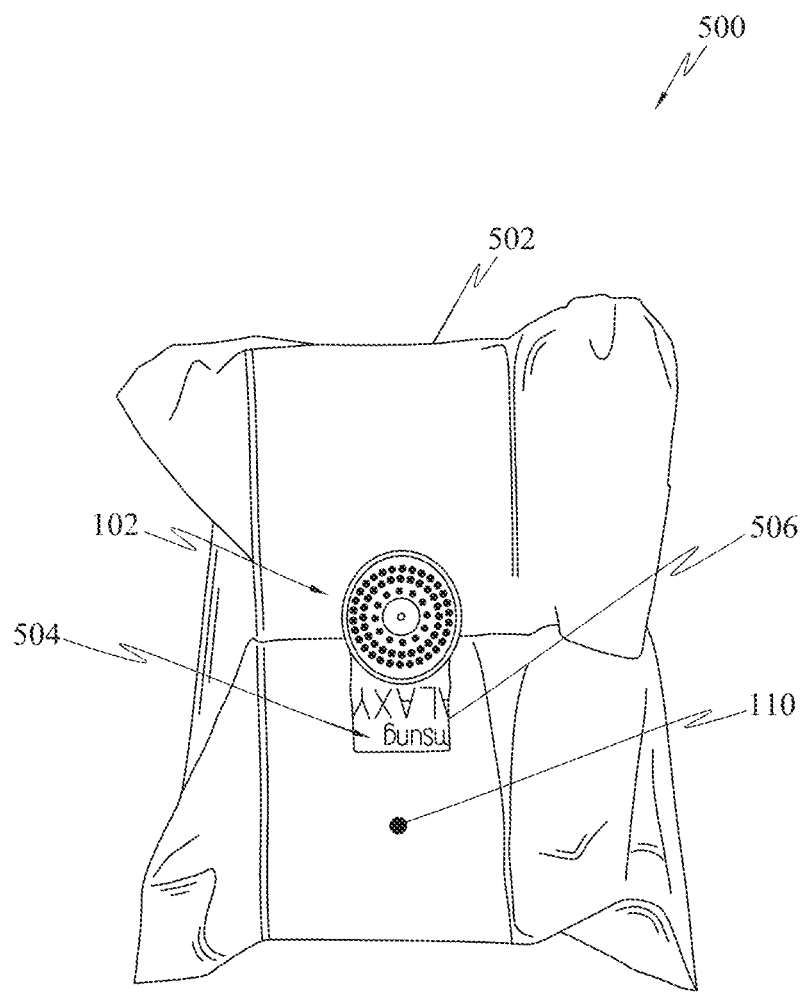
FIG. 5 illustrates tamper proof packing configuration.

FIG. 5 illustrates tamper proof packing configuration 500, in accordance with an embodiment. The packing 500 comprises a package 502, an article 504 and the security label 102. The package may be configured to receive the article 504. The package 502 may define an aperture 506 on one of its surfaces/sides. As an example, if the package is a cover/envelop, one of the sides of the cover defines the aperture 506.

In an embodiment, the package 502 may be, but not limited to, an LDPE envelope.

The article 504 may be placed inside the package 502 in a manner that a portion of the article 504 is exposed by the aperture 506.

The security label 102 may be configured to be engaged to the package 502 in a manner that the security label 102 covers at least a portion of the aperture 506, a portion (of the exposed portion) of the article 504 and a portion of the package 502 thereby forming an adhesive coupling. The bonding of the article 504 to the package 502, using the security label 102, may aid in detecting unauthorized access to the article 504. The package 502 may be folded such that a portion resembling a flap is disposed near or over a portion of the aperture 506. The label 102 may be disposed over the "flap" portion and the article 504, and may as well be disposed over the surface of the package 502, which defines the aperture 506.

The packing 500 protects the article 504 from being taken out of the package 502 by cutting open a side of the package 502, since such an attempt would result in peeling of a surface of the article 504, indicating tampering. Further, attempt to open the "flap" can also have the above discussed consequence.

In an embodiment, the external reference 110 may be disposed over the surface of the package 502 to which the security label 102 is engaged. The security label 102 and the external reference 110 may be associated to each other, as discussed earlier.

In an embodiment, the label 102 may cover the entire aperture 504.

Figure 6:
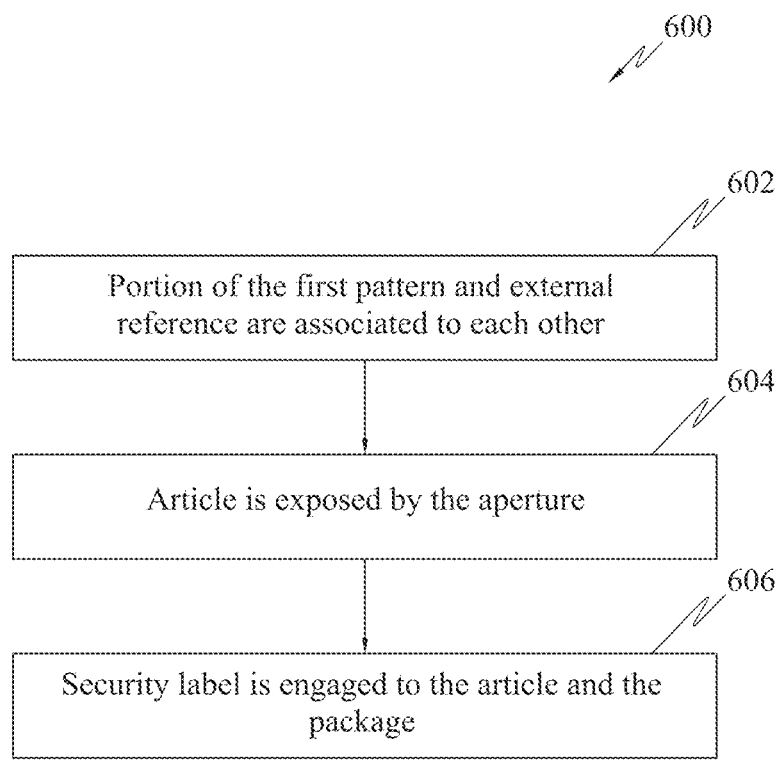
FIG. 6 is a flowchart illustrating a method of packaging.

FIG. 6 is a flowchart 600 illustrating a method of packaging, in accordance with an embodiment. Referring to step 602, the article 504 is received by the package 502, wherein the package 502 defines the aperture 506.

At step 604, the article 504 is placed inside the package 502 such that the article 504 is exposed by the aperture 506.

At step 606, the security label 102 is engaged such that the security label 102 covers at least the portion of the aperture 506, the portion of the article 504 and the portion of the package 502.

Figure 7:
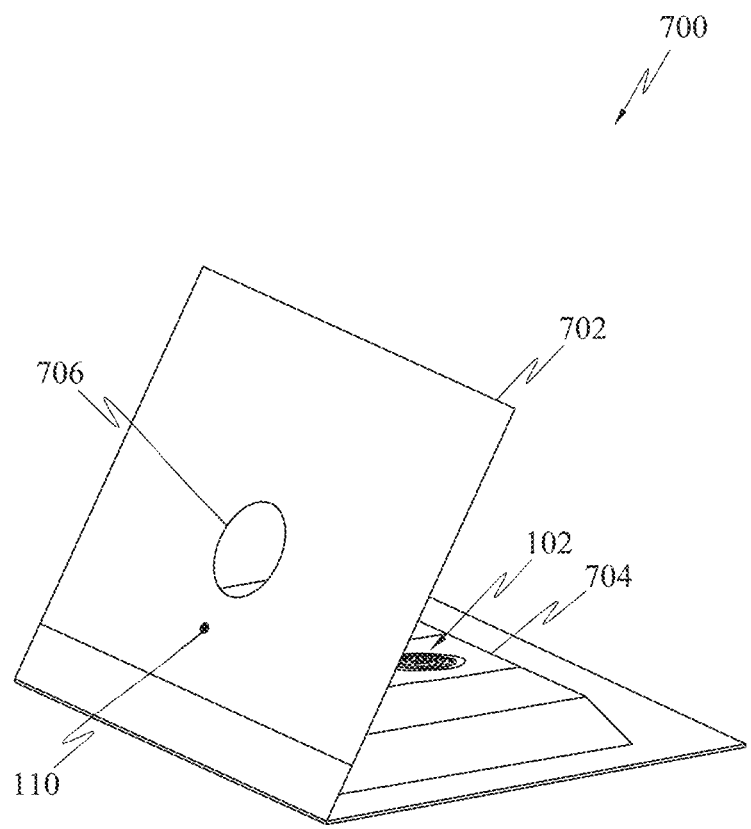
FIG. 7 illustrates an alternate tamper proof packing configuration.

FIG. 7 illustrates an alternate tamper proof packing 700, in accordance with an embodiment. The article 704 may be configured to be received by the package 702, wherein the package 702 defines an aperture 706.

The article 704 may be placed inside the package 702 such that the article 704 is exposed by the aperture 706. Further, the article 704 is placed such that there is no relative motion between the article 704 and the package 702. The relative motion between the article 704 and the package 702 may be arrested by the use of any known techniques such as adhesive tapes and thermocol moulds.

The security label 102 may be configured to be engaged only to the portion of the article 704, such that the label is visible through the aperture 706. The external reference 110 may be engaged to the portion of the package 702. The external reference 110 may be disposed on the package 702 such that the external reference 110 and the label 102 are within a sight of view of an imaging module, so as to detect tampering, as discussed earlier (even without the option of a second pattern).

Figure 8:
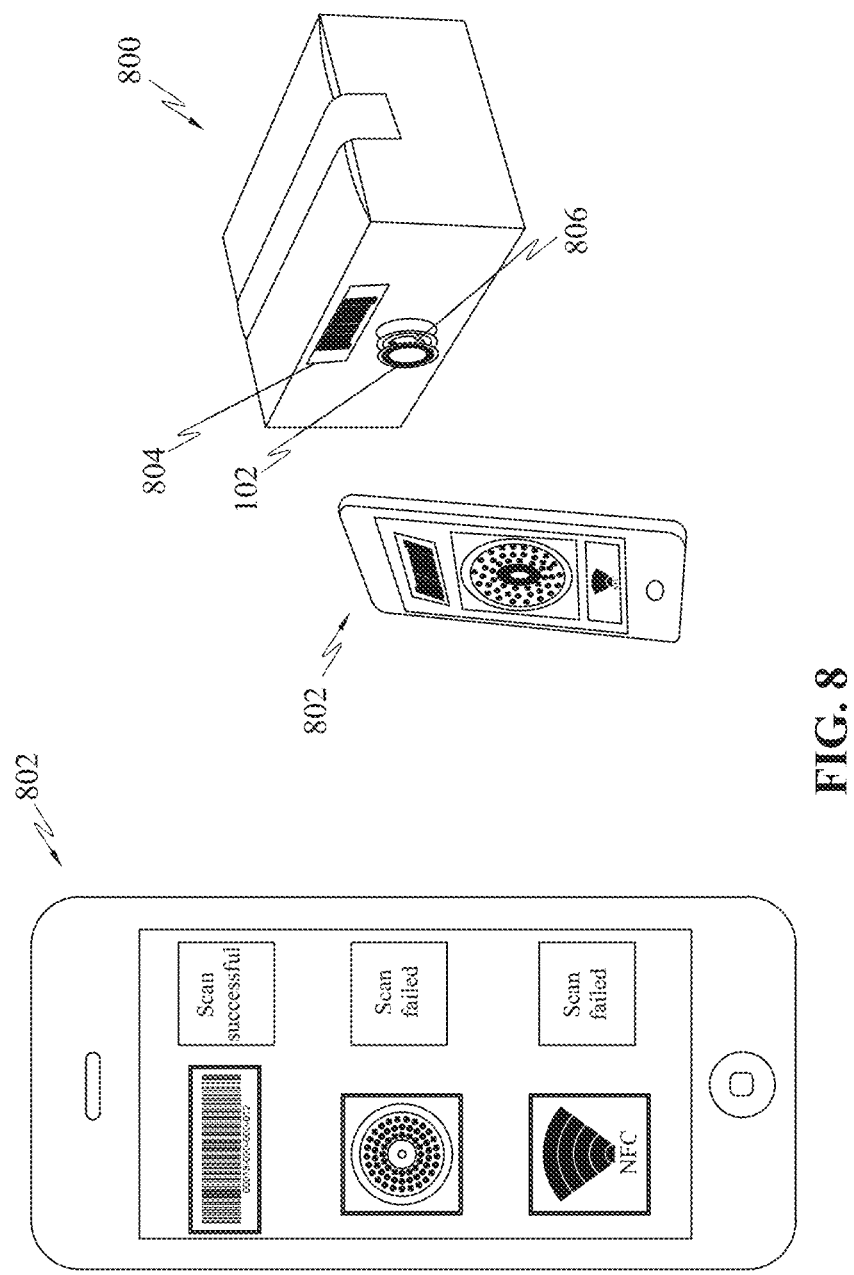
FIG. 8 illustrates a scanning device for detecting multiple credentials simultaneously.

FIG. 8 illustrates a scanning device 802 for detecting multiple credentials simultaneously, in accordance with an embodiment.

The scanning device 802 may have modules that are comparable to the modules of the device discussed in conjunction with FIG. 3. In addition to the capabilities of the earlier device 300, the image capturing module of the device 802 may be configured to capture images of multiple credentials in a single window. Further, an NFC scanner may also be included in the device 802.

The packaging 800 may comprise multiple credentials such as barcode or QR code 804, security label 102 and NFC 806. The scanning device 802, using the image capturing module may capture the image of the barcode 804 and the label 102, and may display the same on the user interface. A credential analysis module may analyse the barcode 804 and the label 102 to obtain information corresponding to the credentials.

In an embodiment, credentials such as NFC 806 may be detected and analysed using the credential analysis module.

The scanning device 802 may display information corresponding to successful/unsuccessful detection/authentication of the credentials 804, 102 and 806. The user interface of the scanning device 802 may display a message "scan successful" corresponding to the successful detection of the credentials and a message "scan failed" corresponding to the unsuccessful detection of the credential.

In another embodiment (not shown), the user interface may display a red boundary surrounding the credential that has not been scanned successfully or identified as tampered, and a green boundary surrounding the credential that has been scanned successfully or identified as not tampered.

Figure 9:
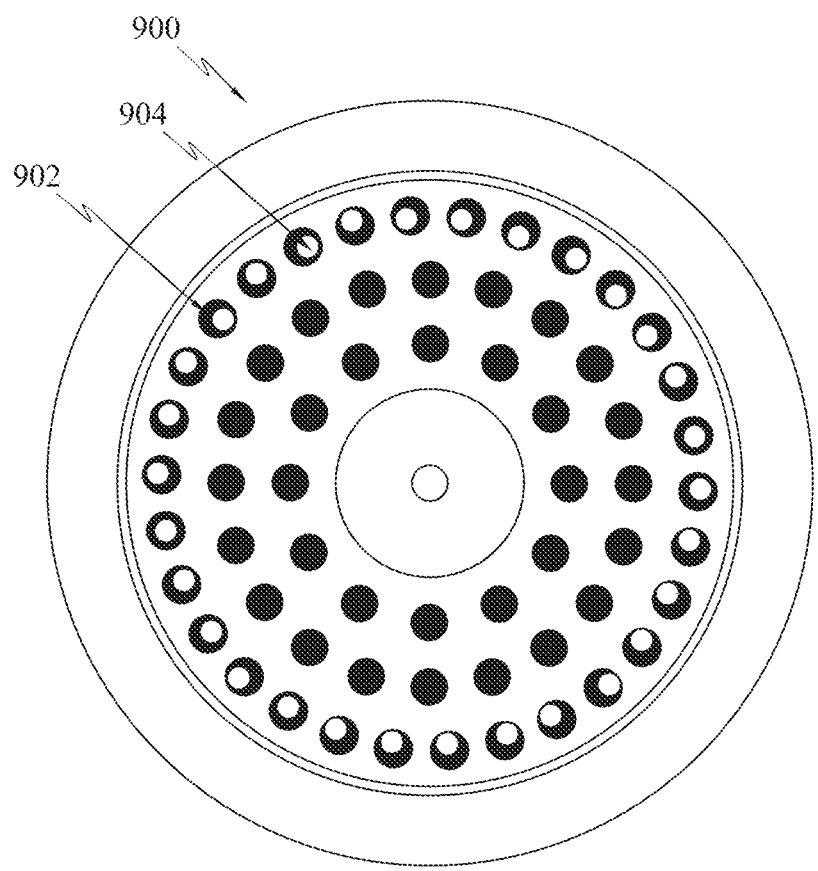
FIG. 9 illustrates an alternate embodiment of a security label.

FIG. 9 illustrates an alternate embodiment of a security label 900. The security label 900 may be configured to have the capabilities of the security label 102 (association of the first pattern with the external reference 110, with or without second pattern) and a credential (comparable to a bar code). The security label 900 may include patterns that can be encoded as the credential to identify the package.

The security label 900 may comprise multiple bands of black dots 902 (these may be similar to the first pattern of the security label 102). The black (first colour) dots 902 may be encoded with a white (second colour) sub-pattern 904. These white sub-patterns 904 within the black dot 902 may be eccentric or concentric to the black dot 902. The parameters defining the white sub-pattern 904 such as dimension, eccentricity and the like, with respect to the black dot 902, may be used as the credential.

In an alternate embodiment, the spatial distribution of each black dots 902 within the bands of black dots 902 may be encoded as the credential.

In another embodiment, the black dots 902 may be associated with the external reference 110 (similar to the association of the first pattern) to form the credential.

In an alternate embodiment, the black dots 902 may be elliptical and the angle of major axis with respect to a standard axis may be encoded as a digit value in a barcode, wherein one dot may be configured to be a start point to decode digital value sequentially from the dot.

There may be multiple ways to encode digital value in dots to represent a unique tracking code in addition to the core feature of deriving the spatial orientation of the security label 102 with respect to the external reference 110.

Figure 10:
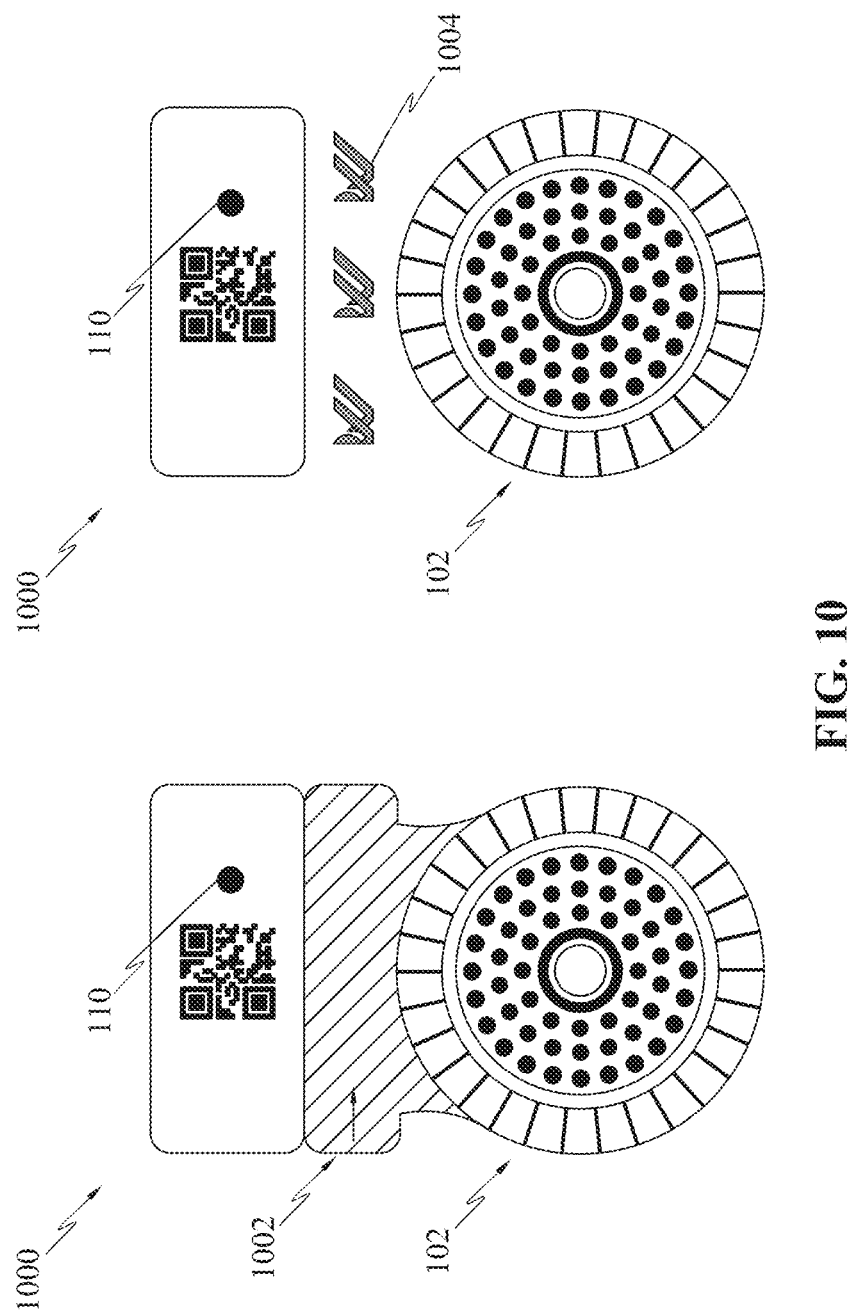
FIG. 10 is an alternate embodiment of a security label product 1000.

FIG. 10 is an alternate embodiment of a security label product 1000. The security label product 1000 may comprise the security label 102, the external reference 110 and a tear-apart portion 1002. The tear apart portion holds the security label 102 and the external reference 110 together.

The security label product 1000 may be pre-registered, wherein the security label 102 and the external reference 110 are associated with each other based on the spatial distribution of the first pattern of the security label 102 with respect to the external reference 110. The external reference 110 may be a portion of a code, such as barcode or QR code, that can uniquely identify the product 1000. Hence, the advantage is that, the spatial distribution of the label 102 relative to the external reference 110 can be preregistered, thereby overcoming the step of registering the orientation after application of the label 102 to the article.

The product 1000 may be engaged to any surface (such as that of the package or the article) and the tear-apart portion 1002 may be peeled off so that the security label 102 and the external reference 110 are separated and may resemble as if the security label 102 and the external reference 110 were applied separately.

In an embodiment, the tear-apart portion 1002 may leave an impression such as branding/logo/insignia 1004 on the surface of the package or the article when peeled off.

Figure 11A:
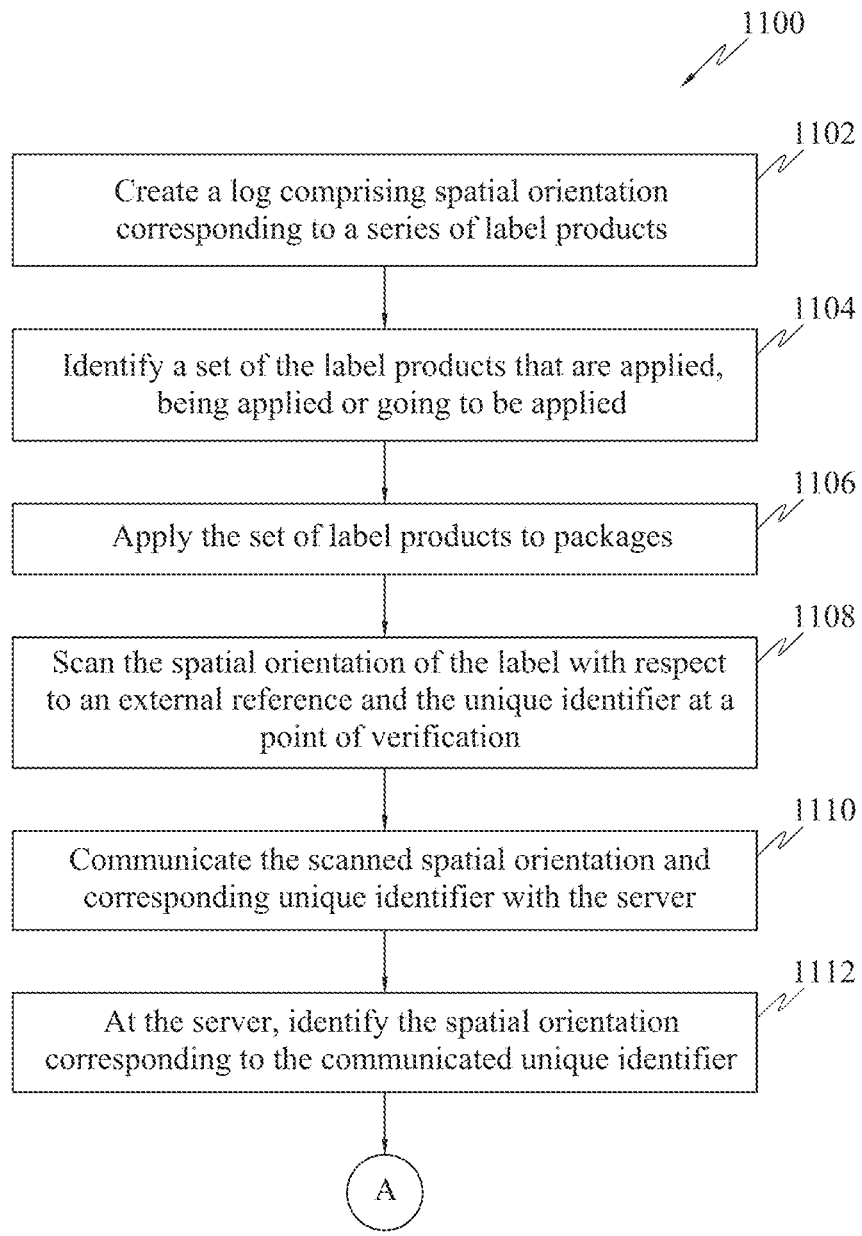
FIGS. 11A-11B is a flowchart of a method of determining tampering of the security label product.
Figure 11B:
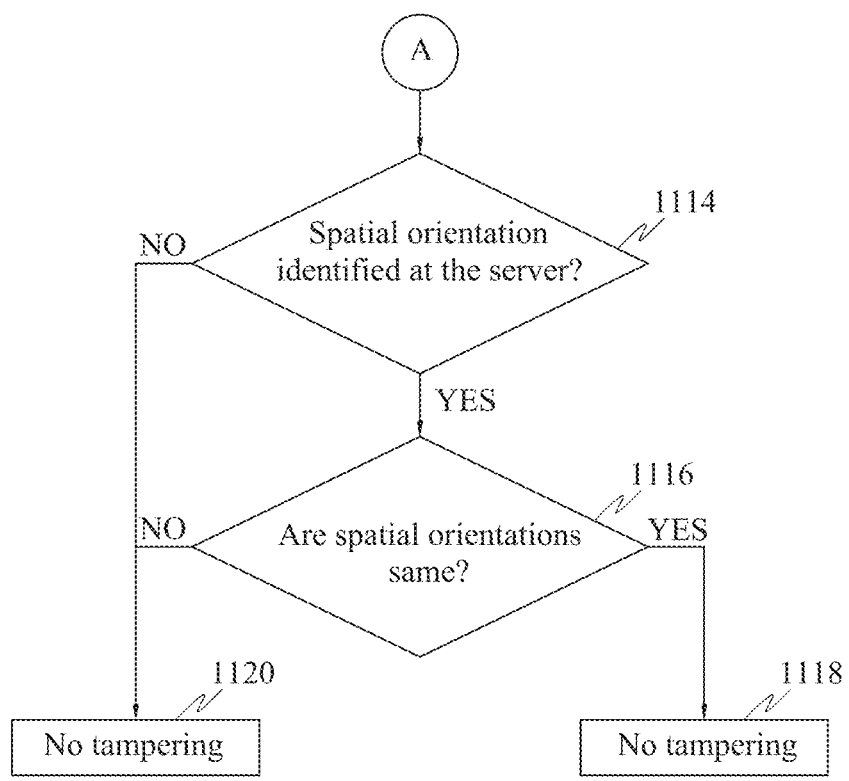

FIGS. 11A-11B is a flowchart 1100 of a method of determining tampering of the security label product 1000. Referring to FIG. 11A, at step 1102, a log that comprises information related to spatial orientation of label products 1000 corresponding to a unique identifier of the label product 1000 is created. In one embodiment, the unique identifier and the security label 102 are at separate portions of the label product 1000. In another embodiment, the external reference 110 may be a portion of the unique identifier. The server 106 may comprise a dedicated database to store the log information. The log may be centralized to enable simultaneous access to multiple users accessing the server 106. The log may be configured to be accessible by the scanning device at the point of verification.

At step 1104, the set of label products 1000 that are applied, being applied or going to be applied is identified. The set of label products 1000 are identified by using the unique identifier associated with at least two of the label products 1000 in the set of label products 1000 that are applied, being applied or going to be applied. The identification may be performed my scanning at least two of the label products 1000 (at extremes) at the point of application of the label product 1000.

At step 1106, the set of label products 1000 are applied to packages. The application of the label products 1000 to packages may be automated.

At step 1108, the spatial orientation of the label 102 with respect to the external reference 110 and the unique identifier are scanned at the point of verification. A scanning device may be used to capture the image of the label product 1000 and identify the spatial orientation and the unique identifier from the captured image of the label product 1000.

At step 1110, the scanned spatial orientation of the label 102 and the corresponding unique identifier are communicated with the server. The scanning device may be equipped with communication modules to communicate the scanned data with the server 106.

At step 1112, the server 106 receives the communicated spatial orientation of the label 102 and corresponding unique identifier. Further, the server 106 searches the log comprising the spatial orientation information of the label products. The server identifies the spatial orientation of the label product 1000 corresponding to the received unique identifier.

Referring to FIG. 11B, at step 1114, the server verifies the identified spatial orientation of the label product 1000 corresponding to the unique identifier. In a scenario, wherein the server fails to identify the spatial orientation of the label product 1000 corresponding to the unique identifier, the scanning device may indicate tampering (step 1120). If the server 106 identifies the spatial orientation of the label product 1000 corresponding to the unique identifier, the identified spatial orientation is further scrutinized.

At step 1116, the server 106 matches the identified spatial orientation and the spatial orientation received from the scanning device. If the identified spatial orientation matches with the spatial orientation received from the scanning device, the scanning device may indicate no tampering (step 1118). If the identified spatial orientation does not match with the spatial orientation received from the scanning device, the scanning device may indicate tampering (step 1120).

Figure 12A:
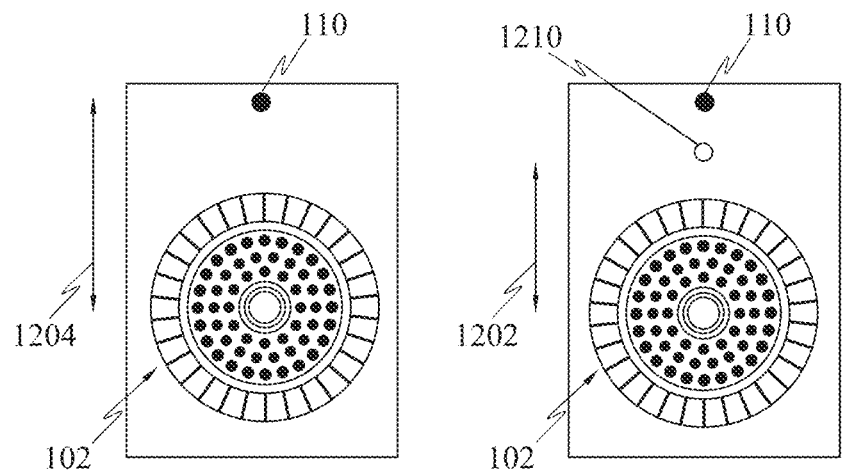
FIGS. 12A-12B illustrates a method of application of the security label.
Figure 12B:
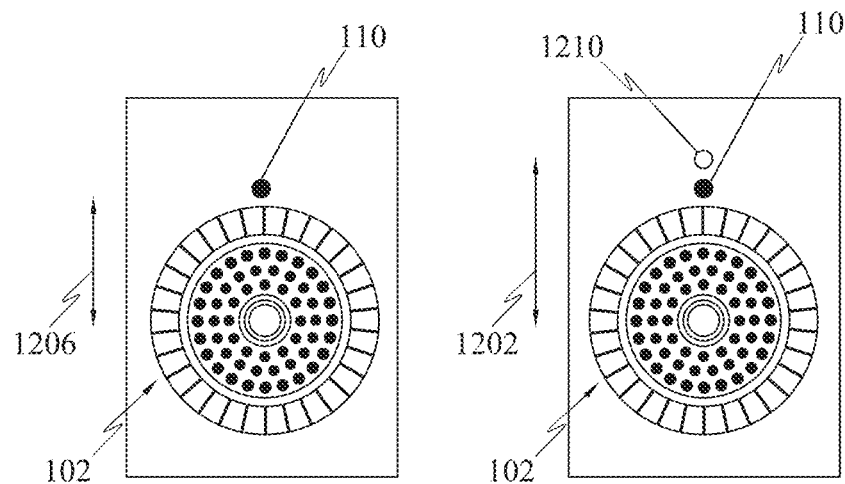

FIGS. 12A and 12B illustrate application of the security label 102, in accordance with an embodiment. In the automated application of security label 102 over a package, the packages move along a packaging line wherein an automated applicator applies the security label 102 over the package at a predetermined position from the external reference 110. The labels 102 are pre-registered (determination of spatial distribution of first pattern of the label 102 with respect to the external reference 110) in factory before being applied over a surface of the package. The label roll can be pre-registered based on spatial distribution of patterns of at least one label and serializing the remaining labels in the roll based on the spatial distribution of patterns of that label 102.

During transit of the package in the packaging line, there are chances that the automated applicator might apply the security label 102 at a location different from a predetermined location due to change in movement of the package along the direction of packaging line.

Referring to FIG. 12A, ideally, the label 102 had to applied at a predetermined location wherein the distance between the centre of the label 102 and the external reference 110 is 1202. However, because of certain unforeseen error, the label 102 is applied at a location away from the predetermined location, wherein the distance between the centre of the label 102 and the external reference 110 is 1204. In such case, when the package is verified for tampering, the scanning device might create a virtual reference 1210 at the predetermined location (at a distance 1202 from the centre of the label 102) corresponding to the label 102 registered in the server 106. Further, the scanning device detects the tampering of the label 102 as discussed earlier.

Referring to FIG. 12B, the label 102 is applied at a location closer than the predetermined location, wherein the distance between the centre of the label 102 and the external reference 110 is 1206. As discussed earlier, the scanning device might create a virtual reference 1210 at the predetermined location (at a distance 1202 from the centre of the label 102) corresponding to the label 102 registered in the server 106.

Figure 13A:
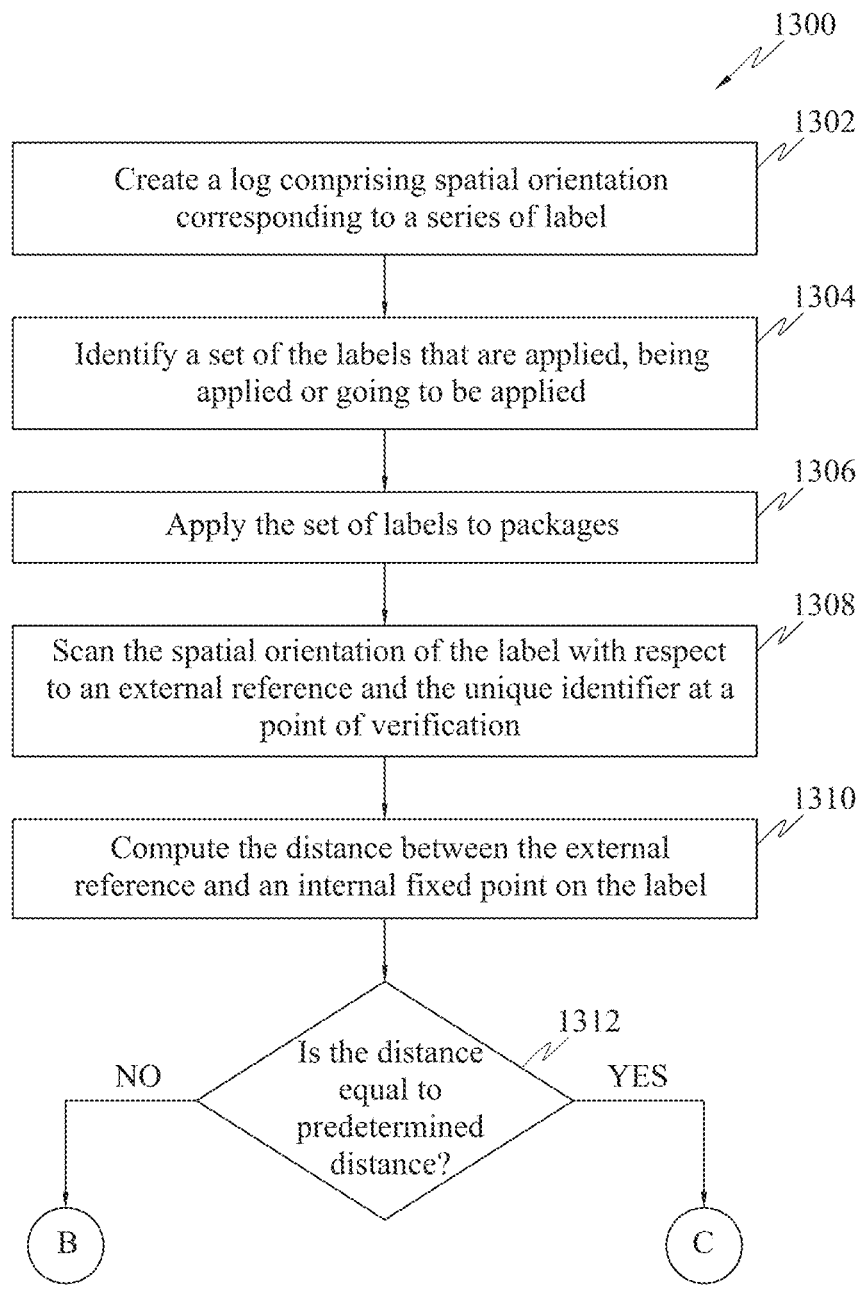
FIGS. 13A-13C is a flowchart of a method of detecting tampering of the security label.
Figure 13B:
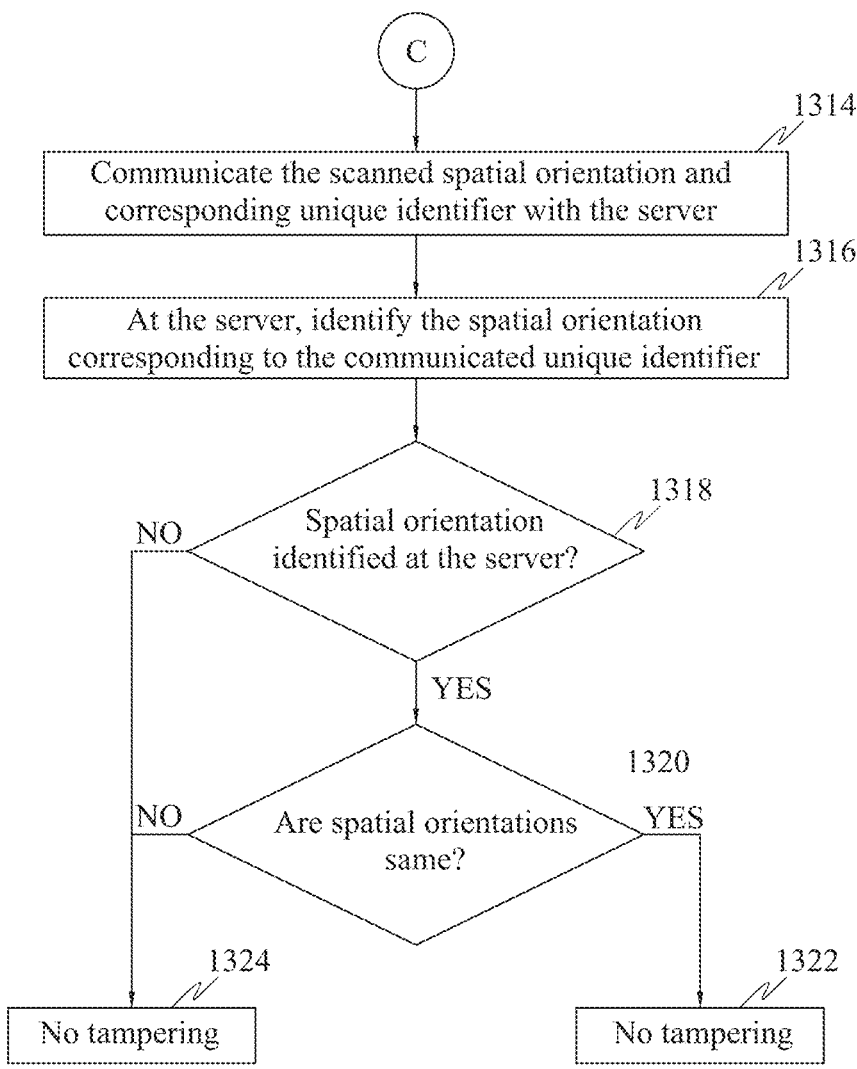
Figure 13C:
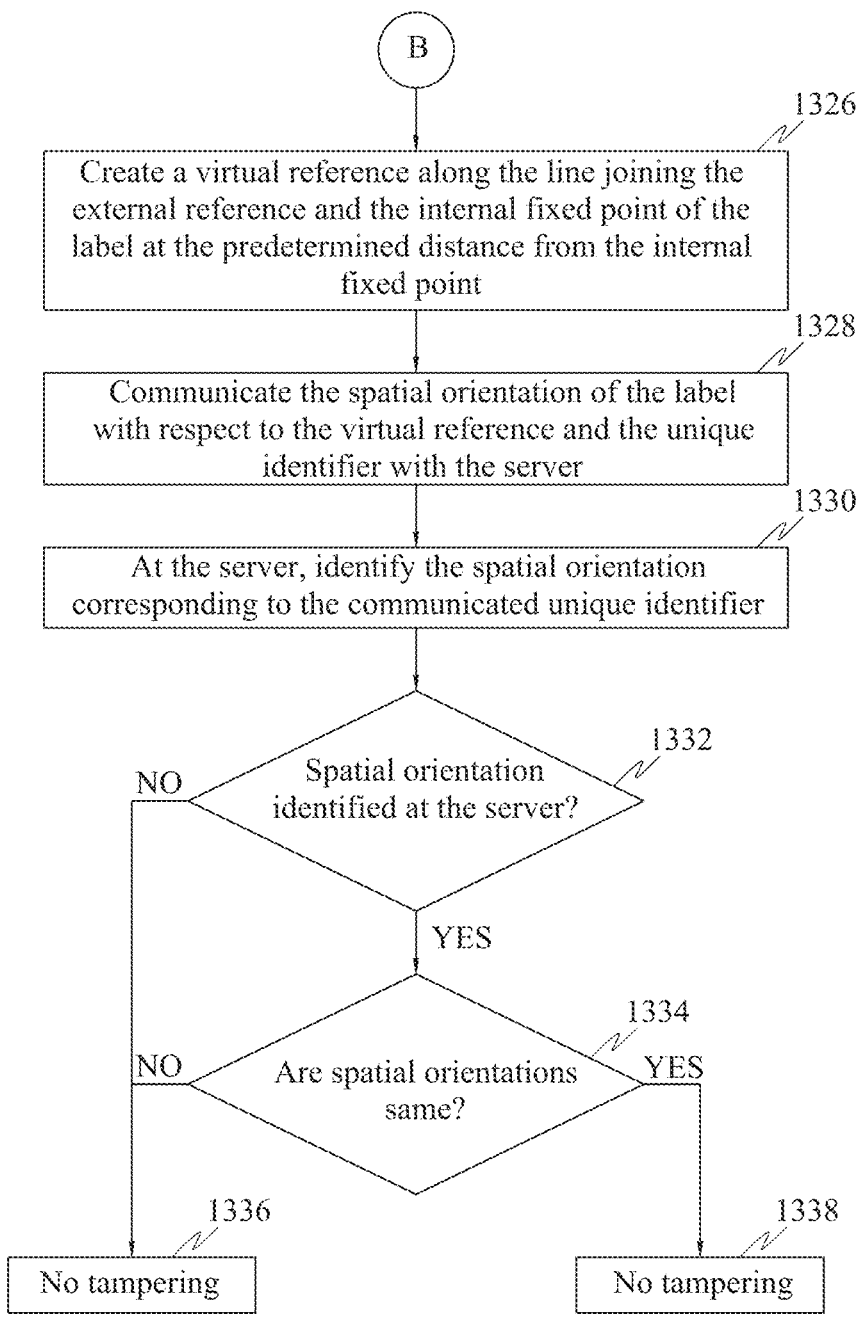

FIGS. 13A-13C is a flowchart 1300 of a method of detecting tampering of the security label 102. Referring to FIG. 13A, at step 1302, a log that comprises information related to spatial orientation of the labels 102 corresponding to a unique identifier of the label 102 is created. In one embodiment, the unique identifier may be a barcode, QR code or the like, that uniquely represents the package. In another embodiment, the external reference 110 may be a portion of the unique identifier. The server 106 may comprise a dedicated database to store the log information. The log may be centralized to enable simultaneous access to multiple users accessing the server 106. The log may be configured to be accessible by the scanning device at the point of verification.

At step 1304, the set of labels 102 that are applied, being applied or going to be applied is identified. The set of labels 102 are identified by using the unique identifier associated with at least two of the labels 102 in the set of labels 102 that are applied, being applied or going to be applied. The identification may be performed my scanning at least two of the labels 102 at the point of application of the label 102.

At step 1306, the set of labels 102 are applied to packages. In one embodiment, the application of the labels 102 to packages may be automated.

At step 1308, the spatial orientation of the label 102 with respect to the external reference 110 and the unique identifier are scanned at the point of verification. A scanning device may be used to capture the image of the label 102 and identify the spatial orientation and the unique identifier from the captured image of the label 102.

At step 1310, the scanning device computes the distance between the external reference 110 and an internal fixed point on the label 102. In one embodiment, the internal fixed point is the geometric centre of the security label 102.

At step 1312, the scanning device verifies if the computed distance between the external reference 110 and an internal fixed point on the label 102 is equal to the predetermined distance between the external reference 110 and an internal fixed point on the label 102.

Referring to FIG. 13B, if the computed distance between the external reference 110 and an internal fixed point on the label 102 is equal to the predetermined distance, at step 1314, the scanned spatial orientation of the label 102 and the corresponding unique identifier are communicated with the server. The scanning device may be equipped with communication modules to communicate the scanned data with the server 106.

At step 1316, the server 106 receives the communicated spatial orientation of the label 102 and corresponding unique identifier. Further, the server 106 searches the log comprising the spatial orientation information of the labels 102. The server 106 identifies the spatial orientation of the labels 102 corresponding to the received unique identifier.

At step 1318, the server 106 verifies the identified spatial orientation of the labels 102 corresponding to the unique identifier. In a scenario, wherein the server 106 fails to identify the spatial orientation of the labels 102 corresponding to the unique identifier, the scanning device may indicate tampering (step 1324). If the server 106 identifies the spatial orientation of the label 102 corresponding to the unique identifier, the identified spatial orientation is further scrutinized.

At step 1320, the server 106 matches the identified spatial orientation and the spatial orientation received from the scanning device. If the identified spatial orientation matches with the spatial orientation received from the scanning device, the scanning device may indicate no tampering (step 1322). If the identified spatial orientation does not match with the spatial orientation received from the scanning device, the scanning device may indicate tampering (step 1324).

Referring to step 1312, if the computed distance between the external reference 110 and an internal fixed point on the label 102 is not equal to the predetermined distance between the external reference 110 and an internal fixed point on the label 102, the scanning device may create a virtual reference.

Referring to FIG. 13C, at step 1326, the scanning device creates a virtual reference along the line joining the external reference and the internal fixed point of the label at the predetermined distance from the internal fixed point. Now, the virtual reference is placed (virtually) at the predetermined distance between the external reference 110 and an internal fixed point on the label 102.

At step 1328, the spatial orientation of the label 102 with respect to the virtual reference and the unique identifier are communicated with the server.

At step 1330, the server 106 receives the communicated spatial orientation of the label 102 with respect to the virtual reference and corresponding unique identifier. Further, the server 106 searches the log comprising the spatial orientation information of the labels 102. The server 106 identifies the spatial orientation of the labels 102 corresponding to the received unique identifier.

At step 1332, the server 106 verifies the identified spatial orientation of the labels 102 corresponding to the unique identifier. In a scenario, wherein the server 106 fails to identify the spatial orientation of the labels 102 corresponding to the unique identifier, the scanning device may indicate tampering (step 1336). If the server 106 identifies the spatial orientation of the label 102 corresponding to the unique identifier, the identified spatial orientation is further scrutinized.

At step 1334, the server 106 matches the identified spatial orientation and the spatial orientation received from the scanning device. If the identified spatial orientation matches with the spatial orientation received from the scanning device, the scanning device may indicate no tampering (step 1338). If the identified spatial orientation does not match with the spatial orientation received from the scanning device, the scanning device may indicate tampering (step 1336).

Figure 14C:
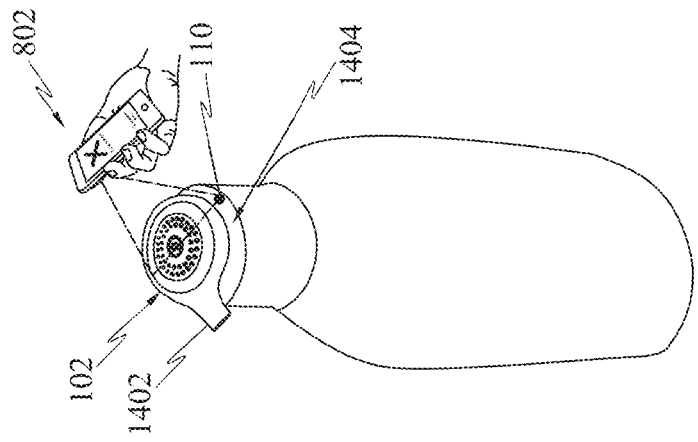
FIG. 14A-14C illustrates a tamper proof packing of a dispenser.
Figure 14B:
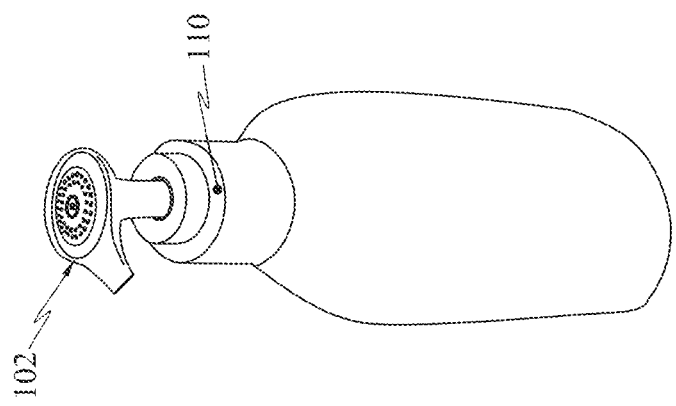
Figure 14A:
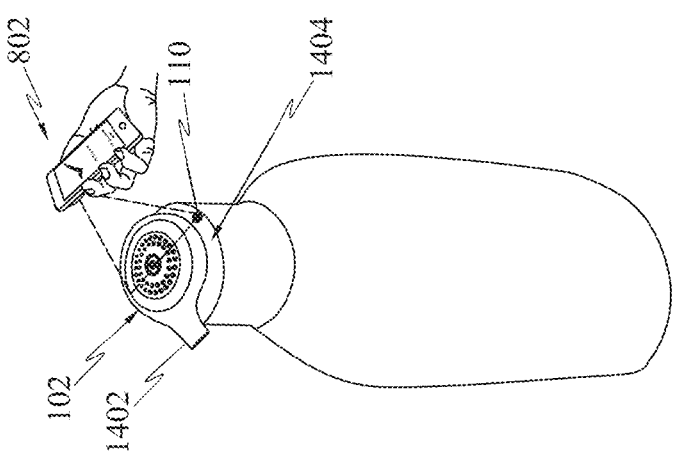

FIGS. 14A-14C illustrates a tamper proof packing of a dispenser. Referring to FIG. 14A, the security label 102 may be applied to a first surface 1402 of the dispenser in factory sealed position. The security label 102 may be associated with the external reference 110 disposed at a second surface 1404. In one embodiment, the security label 102 and the external reference 110 may be at different surfaces of the dispenser. The spatial orientation of the label 102 with respect to the external reference 110 at the sealed position is registered.

Referring to FIG. 14B, when the dispenser is opened, the spatial orientation between the label 102 and the external reference 110 changes. Therefore, the security label 102 and the external reference 110 may be disassociated. Referring to FIG. 14C, when the re-sealed dispenser is scanned for tampering, the scanning device 802 indicates tampering.

Figure 15:
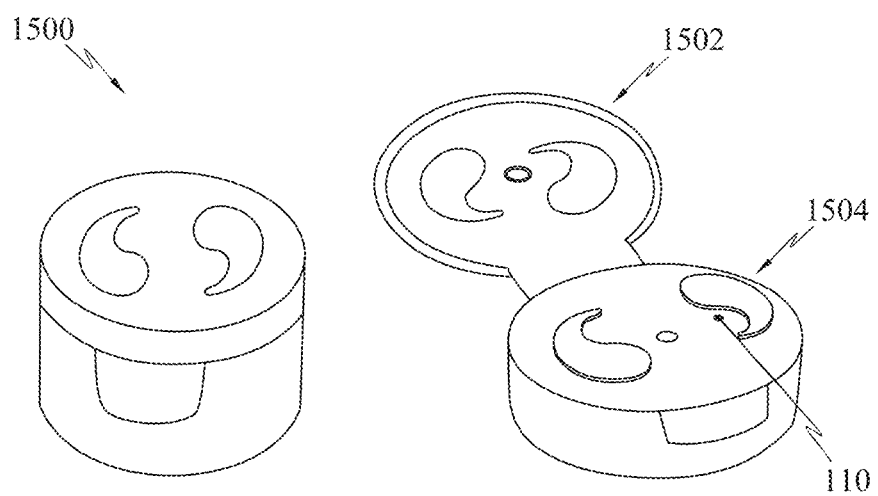
FIG. 15 illustrates an embodiment of tamper proof packing of a flip top container.
Figure 15:
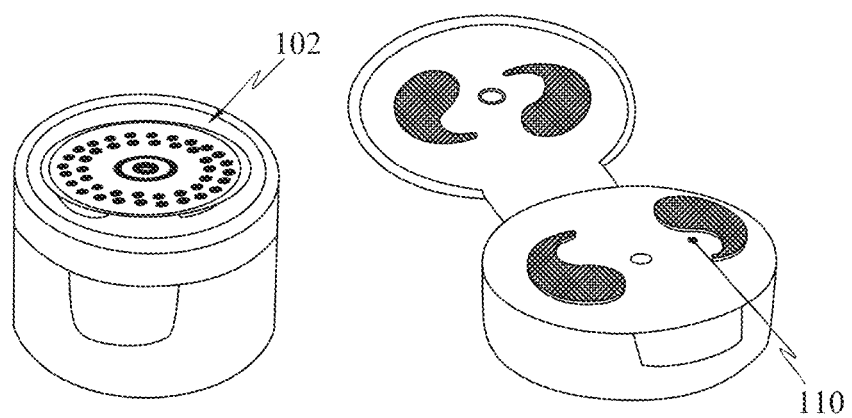
Figure 16:
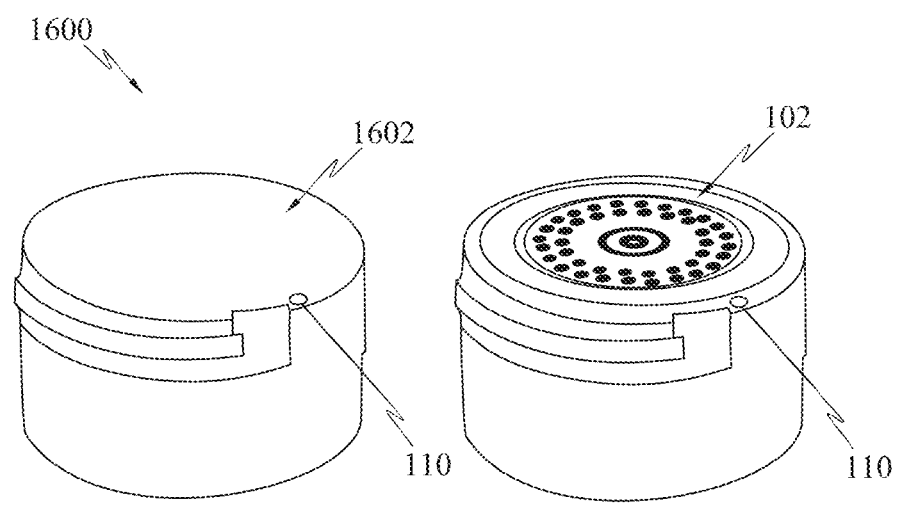
FIG. 16 illustrates an alternate embodiment of tamper proof packing of a flip top container.
Figure 17:
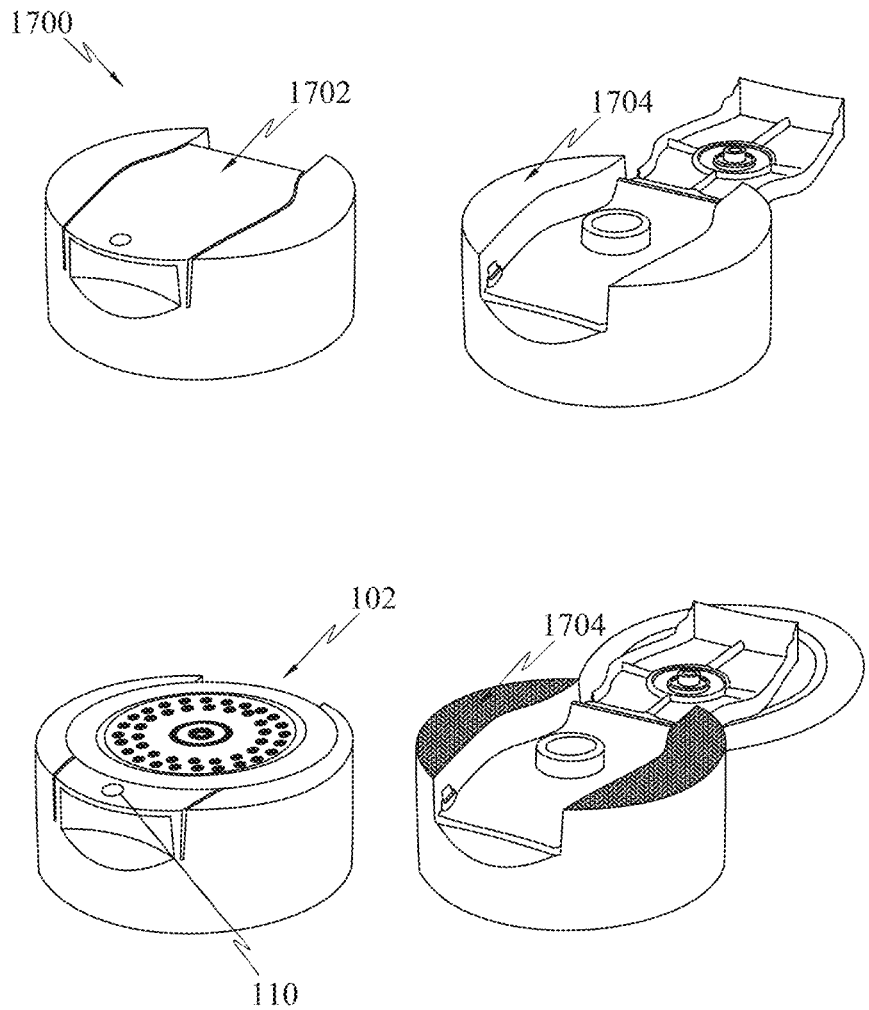
FIG. 17 illustrates an embodiment of tamper proof packing of a flip top container.

FIGS. 15-17 illustrates different embodiments of tamper proof packing of flip top containers. Referring to FIG. 15, the security label 102 is affixed to a flip-top type container 1500 wherein the security label 102 is in contact with a first surface 1502 and a second surface 1504. The first surface 1502 may be hinged at an end and the second surface 1504 may be fixed. The external reference 110 may be located at a predetermined location on the second surface 1504. When the first surface 1502 is opened, the security label 102 stays intact with the first surface 1502 thereby leaving a visible pattern over the second surface 1504 of the container 1500. Hence, there is a change in contour of the first pattern of the security label 102 that disassociates the security label 102 and the external reference 110. Therefore, upon authentication, the tampering of the container 1500 is detected.

Referring to FIG. 16, the security label 102 is affixed to a flip-top type container 1600 wherein the security label 102 is in contact with a surface 1602. The surface 1602 may be hinged at an end. The external reference 110 may be located at a predetermined location on the surface 1602. When the surface 1602 is opened, the spatial orientation of the label 102 with respect to the external reference is disturbed that results in a change in contour of the first pattern of the security label 102 that disassociates the security label 102 and the external reference 110.

Referring to FIG. 17, the security label 102 is affixed to a flip-top type container 1700 wherein the security label 102 is in contact with a first surface 1702 and a second surface 1704. The first surface 1702 may be hinged at an end and the second surface 1704 may be fixed. The external reference 110 may be located at a predetermined location on the second surface 1704. When the first surface 1702 is opened, the security label 102 stays intact with the first surface 1702 thereby leaving a visible pattern over the second surface 1704 of the container 1700. Hence, there is a change in contour of the first pattern of the security label 102 that disassociates the security label 102 and the external reference 110.

Figure 18:
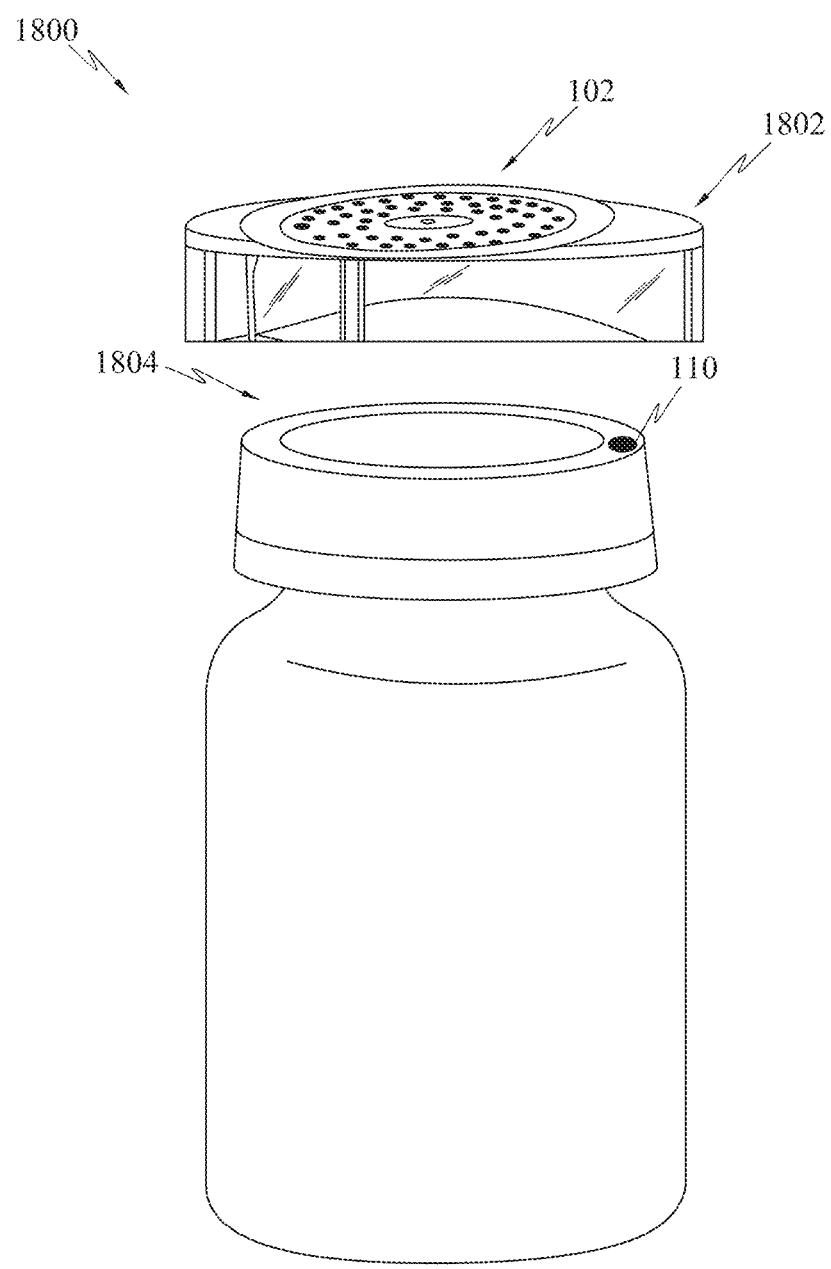
FIG. 18 illustrates a tamper proof packing of a container.

FIG. 18 illustrates a tamper proof packing of a container 1800. The security label 102 is applied over a surface 1802 of a push-lock and break-open type cover that is engaged to a cap of the container in a manner that the cover has to be broken, to gain access to the cap of the container 1800. The external reference 110 may be placed on a surface 1804 of the cap of the container 1800 and associated with the security label 102 on the cover. If the cover is broken, the spatial orientation of the security label 102 with respect to the external reference 110 changes. This change in spatial orientation results in change in contour of the first pattern of the security label 102 thereby indicating the tampering of the container 1800 during authentication.

FIGS. 19A-19D illustrates a tamper proof packing of an envelope 1900. Paper surface may not be adhesive friendly when compared to plastic. Referring to FIG. 19A, the envelope 1900, generally a paper envelope, comprises a first surface 1902 and a second surface 1906. The first surface defines a first aperture 1904 that may be circular in shape and the second surface defines a second aperture 1908 that may be semi-circular in shape. The second surface 1906 may resemble a flap that comes in contact with the first surface 1902 when folded.

As shown in FIG. 19B, a first membrane 1912, typically a plastic sheet, is placed beneath the first surface 1902 in a manner that a portion of the first membrane 1912 is exposed by the first aperture 1904. Also, a second membrane 1910, typically a plastic sheet with adhesives on its surfaces, is engaged with the second surface 1906 in a manner that a portion of the second membrane 1910 is exposed by the second aperture 1908.

Referring to FIG. 19C, the second surface 1906 is folded in a manner that the second membrane 1910 is engaged with a portion of the first surface 1902 and a portion of the first membrane 1912. The first aperture 1904 and the second aperture 1908 may overlap with each other exposing a portion of first membrane 1912 and second membrane 1910.

Referring to FIG. 19D, the security label 102 is applied over the portion of first membrane 1912 and second membrane 1910 exposed by the first aperture 1904 and the second aperture 1908. In case of tampering, the security label 102 exposes the second pattern 206 on the portion of first membrane 1912 and/or the second membrane 1910 to which the label 102 is engaged.

In an embodiment, the external reference 110 may be disposed over the surface of the envelope 1900 to which the security label 102 is engaged. The security label 102 and the external reference 110 may be associated to each other, as discussed earlier. If using plastic sheet is not feasible for volume automated production one can use plastic coated paper for better adhesion and may avoid apertures 1904 and 1908 on surfaces 1902 and 1906 respectively.

Figure 19E:
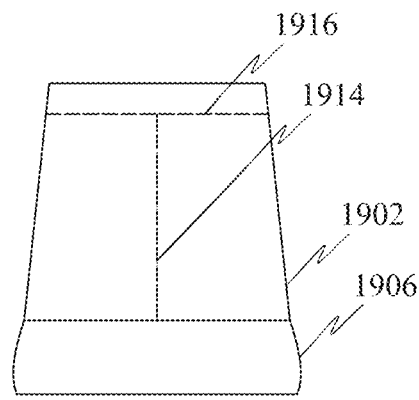
FIGS. 19A-19D illustrates a tamper proof packing of an envelope.

Referring to FIG. 19E, an alternate embodiment of the envelope 1900 may comprise a centre seam 1914 and a bottom seal 1916. Despite sealing by the security label 102, the envelope 1900 can be opened at joining edges such as the centre seam 1914 and bottom seal 1916.

Figure 19F:
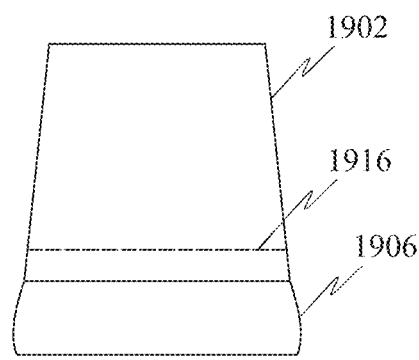

Referring specifically to FIG. 19F, the bottom seal 1916 is extended such that once folded it forms the joint on the area that gets covered by the closing flap (second surface 1906) and also conceals the centre seam 1914. Once second surface 1906 (closing flap) is closed there is no joining-edges exposed and the envelope 1900 has to be cut for any intrusion. Further, concealing the cut by using adhesive tapes may be prevented by coating the outside surface with silicon leaving the label application area and no adhesive tapes can be applied on the silicon coated surface.

In one embodiment, a label such as the security label 102, a barcode label or the like may be engaged to the package in a manner that the longitudinal axis of the label is inclined at an angle with respect to an opening edge of the package.

Therefore, when the label is tampered, the first pattern associated with the label gets distorted thereby enabling in detecting tampering of the package. The angle of inclination is chosen such that the tampering causes maximum distortion of the first pattern.

In another embodiment, the opening edge of the package has a non-linear configuration such as a zig-zag edge over which the label is engaged at an angle. This configuration aids in increasing the distortion of the first pattern caused by the tampering of the label.

The processes described above is described as a sequence of steps, this was done solely for the sake of illustration. Accordingly, it is contemplated that some steps may be added, some steps may be omitted, the order of the steps may be re-arranged, or some steps may be performed simultaneously.

The example embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. A method of automated scanning of a security label, the method comprising:
   acquiring at least one image by a scanning device during a scanning process;
   sending the image to a remote server along with scan records; and
   analyzing the image at the remote server, wherein analyzing the image comprises determining:
   positioning of the security label in a scan preview of the scanning device;
   intentional or unintentional defacing of the security label in the scan preview of the scanning device, the security label being associated with a reference point;
   condition of an asset on which the security label is applied, wherein the asset comprises the reference point associated with the security label, and condition of the scanning device;
   lighting condition when acquiring the image by the scanning device;
   height at which the scanning device is positioned relative to the security label; and
   orientation of the scanning device with respect to the asset upon which the security label is applied;
   wherein the scan records comprise meta data comprising a location at which the image was acquired, a timestamp at which the image was acquired, and at-least one of a signature or a picture of a scanning personnel.

* * * * *